(12) United States Patent
Kawai et al.

(10) Patent No.: US 10,607,450 B2
(45) Date of Patent: Mar. 31, 2020

(54) GAME SYSTEM, CONTROL METHOD, AND STORAGE MEDIUM

(71) Applicant: Konami Digital Entertainment Co., Ltd., Minato-ku, Tokyo (JP)

(72) Inventors: Norifumi Kawai, Minato-ku (JP); Shinya Suga, Minato-ku (JP); Manabu Kitagawa, Minato-ku (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 499 days.

(21) Appl. No.: 15/338,122

(22) Filed: Oct. 28, 2016

(65) Prior Publication Data

US 2017/0046907 A1    Feb. 16, 2017

Related U.S. Application Data

(63) Continuation of application No. PCT/JP2015/066712, filed on Jun. 10, 2015.

(30) Foreign Application Priority Data

Jun. 12, 2014  (JP) .................................. 2014-121176

(51) Int. Cl.
*A63F 13/00* (2014.01)
*G07F 17/32* (2006.01)
(Continued)

(52) U.S. Cl.
CPC ............ *G07F 17/329* (2013.01); *A63F 13/52* (2014.09); *A63F 13/837* (2014.09);
(Continued)

(58) Field of Classification Search
CPC ............ G07F 17/3211; G07F 17/3274; G07F 17/3295; G07F 17/3262
See application file for complete search history.

(56) References Cited

U.S. PATENT DOCUMENTS

| | | | |
|---|---|---|---|
| 9,342,956 B2 * | 5/2016 | Hughes | ............... G07F 17/3258 |
| 2002/0049082 A1 * | 4/2002 | Bansemer | ............ A63F 9/0291 463/20 |

(Continued)

FOREIGN PATENT DOCUMENTS

| JP | 2008-510525 A | 4/2008 |
|---|---|---|
| JP | 2010-273823 A | 12/2010 |

(Continued)

OTHER PUBLICATIONS

JP Notification of Reasons for Refusal (JP Patent Appln. No. 2014-121176); Date of Drafting: May 18, 2017; 8 pages.

(Continued)

*Primary Examiner* — James S. McClellan
*Assistant Examiner* — Kevin M Carter
(74) *Attorney, Agent, or Firm* — Howard & Howard Attorneys PLLC

(57) ABSTRACT

A game system executes lottery processing where at least one lottery candidate is selected from plural lottery candidates; gives value according to the lottery result to a user; displays on a monitor a game screen for performing a lottery; controls a shooting game to be played by the user while the game screen is displayed on the monitor; changes an expectant value as the lottery result according to a game-play state of the shooting game; and settles the change at a predetermined timing of the shooting time. Then, the game system executes the lottery processing based on the expectant value settled.

16 Claims, 19 Drawing Sheets

(51) Int. Cl.
*A63F 13/837* (2014.01)
*A63F 13/52* (2014.01)
*A63F 13/21* (2014.01)

(52) U.S. Cl.
CPC ...... *G07F 17/3211* (2013.01); *G07F 17/3246* (2013.01); *G07F 17/3267* (2013.01); *A63F 13/21* (2014.09); *A63F 2300/201* (2013.01)

(56) References Cited

U.S. PATENT DOCUMENTS

| | | | | |
|---|---|---|---|---|
| 2004/0002380 | A1* | 1/2004 | Brosnan | A63F 13/10 463/32 |
| 2008/0300040 | A1* | 12/2008 | Goto | G07F 17/32 463/17 |
| 2009/0264175 | A1* | 10/2009 | Goto | G07F 17/32 463/17 |
| 2010/0056247 | A1* | 3/2010 | Nicely | G07F 17/3211 463/20 |
| 2010/0304821 | A1 | 12/2010 | Okada | |
| 2013/0072281 | A1* | 3/2013 | Sasaki | G07F 17/32 463/17 |
| 2013/0084965 | A1* | 4/2013 | Gura | G07F 17/3272 463/26 |
| 2013/0237318 | A1* | 9/2013 | Colaco | A63F 13/12 463/31 |
| 2014/0087808 | A1* | 3/2014 | Basallo | G07F 17/3262 463/16 |

FOREIGN PATENT DOCUMENTS

| | | |
|---|---|---|
| JP | 2013-198590 A | 10/2013 |
| JP | 2013-240452 A | 12/2013 |
| WO | 2006/023907 A2 | 3/2006 |

OTHER PUBLICATIONS

Decision to Grant a Patent (JP Patent Application No. 2014-121176): Date of Drafting: Dec. 11, 2017; Includes English Translation; 6 pages.
International Search Report (PCT/JP2015/066712); dated Jul. 28, 2015.

* cited by examiner

| LOTTERY OBJECT | LOTTERY CANDIDATE | LOTTERY PROBABILITY |
|---|---|---|
| Image A | 1000pcs | 1/4 |
| Image B | 50pcs | 1/4 |
| Image C | 20pcs | 1/4 |
| Image D | 10pcs | 1/4 |

EXPECTED VALUE OF CREDIT REWARD: 270

⇩ LOTTERY CANDIDATE CHANGED

T2

| LOTTERY OBJECT | LOTTERY CANDIDATE | LOTTERY PROBABILITY |
|---|---|---|
| Image A' | 1500pcs | 1/4 |
| Image B | 50pcs | 1/4 |
| Image C | 20pcs | 1/4 |
| Image D | 10pcs | 1/4 |

EXPECTED VALUE OF CREDIT REWARD: 395

 EXPECTED VALUE INCREASES

⇧ PROBABILITY CHANGED

T3

| LOTTERY OBJECT | LOTTERY CANDIDATE | LOTTERY PROBABILITY |
|---|---|---|
| Image A | 1000pcs | 1/2 |
| Image B | 50pcs | 1/6 |
| Image C | 20pcs | 1/6 |
| Image D | 10pcs | 1/6 |

EXPECTED VALUE OF CREDIT REWARD: 513.3

EXPECTED VALUE INCREASES
=EXPECTANT VALUE AS LOTTERY RESULT INCREASES

| ROULETTE BOARD | IMAGE | LOTTERY PROBABILITY |
|---|---|---|
| 1 | 10WIN | 1/4 |
| 2 | 20WIN | 1/4 |
| 3 | 50WIN | 1/4 |
| 4 | JACKPOT1 | 1/4 |

| IMAGE | REWARD |
|---|---|
| 10WIN | 10-CREDIT |
| 20WIN | 20-CREDIT |
| 50WIN | 50-CREDIT |
| 100WIN | 100-CREDIT |
| ⋮ | ⋮ |
| JACKPOT1 | 1000-CREDIT |
| JACKPOT2 | 1500-CREDIT |
| ⋮ | ⋮ |

GAME SYSTEM, CONTROL METHOD, AND STORAGE MEDIUM

CROSS-REFERENCE TO RELATED APPLICATION

This application is a continuation of PCT Application No. PCT/JP2015/066712, filed Jun. 10, 2015, which claims priority to Japanese Patent Application No. 2014-121176, filed Jun. 12, 2014, the disclosures of which are hereby incorporated by reference in their entirety.

TECHNICAL FIELD

The present invention relates to a game system and the like having a lottery device.

BACKGROUND ART

There is known to be a slot game machine which makes a change to contents of a symbol table which is used for a lottery, in order to make a change to a pay-out rate (for example, see Patent Literature 1). In this slot game machine, when a game mode moves from a normal game into a bonus game, some wild symbols are added to the symbol table.

CITATION LIST

Patent Literature

PTL1: JP2010-273823 A.

SUMMARY OF INVENTION

Technical Problem

A conventional processing for making a change to contents of the symbol table is executed before a lottery, and a lottery processing is executed with the symbol table changed. On the other hand, there is no game system where, in the process of lottery performance, a user comes into play in information of internal processing of the lottery in a positive manner to affect the lottery result.

Therefore, the present invention aims to provide a game system where, in the process of lottery processing, a user is allowed to come into play in information of internal processing of the lottery in a positive manner to affect the lottery result.

Solution to Problem

A game system as one aspect of the present invention is a game system including a computer, the computer by executing a computer program functioning as: a lottery execution device which is configured to execute lottery processing where at least one lottery candidate is selected from a plurality of lottery candidates, and give value according to a lottery result to a user; a performance control device which is configured to control a display device to display a lottery-performance image which is an image for performing a lottery; a game control device which is configured to control a game which is played by a user while the lottery-performance image is displayed on the display device; and a value change device which is configured to change an expectant value as the lottery result depending on a game-play state of the game, and settle the expectant value changed at predetermined timing of the game, wherein the lottery execution device is configured to execute the lottery processing based on the expectant value settled by the value change device.

A control method as one aspect of the present invention is a control method of a computer incorporated into a game system, the control method comprising the steps: a lottery execution step of executing lottery processing where at least one lottery candidate is selected from a plurality of lottery candidates, and giving value according to a lottery result to a user; a performance control step of controlling a display device to display a lottery-performance image which is an image for performing a lottery; a game control step of controlling a game which is played by a user while the lottery-performance image is displayed on the display device; and a value change step of changing an expectant value as the lottery result depending on a game-play state of the game, and settling the expectant value changed at predetermined timing of the game, wherein the lottery execution step of executing the lottery processing based on the expectant value settled by the value change device.

A non-transitory computer readable storage medium as one aspect of the present invention is a non-transitory computer readable storage medium having stored therein a computer program to be executed by a computer of a game system, the computer program comprising instructions that cause the computer to functions as: a lottery execution device which is configured to execute lottery processing where at least one lottery candidate is selected from a plurality of lottery candidates, and give value according to a lottery result to a user; a performance control device which is configured to control a display device to display a lottery-performance image which is an image for performing a lottery; a game control device which is configured to control a game which is played by a user while the lottery-performance image is displayed on the display device; and a value change device which is configured to change an expectant value as the lottery result depending on a game-play state of the game, and settle the expectant value changed at predetermined timing of the game, wherein the lottery execution device is configured to execute the lottery processing based on the expectant value settled by the value change device.

BRIEF DESCRIPTION OF DRAWINGS

FIG. 8 is a graphic explanation of an expectant value as a lottery result.

FIG. 15 is a diagram showing one example of lottery table data.

FIG. 16 is a diagram showing one example of image data.

DESCRIPTION OF EMBODIMENTS

Figure 1:
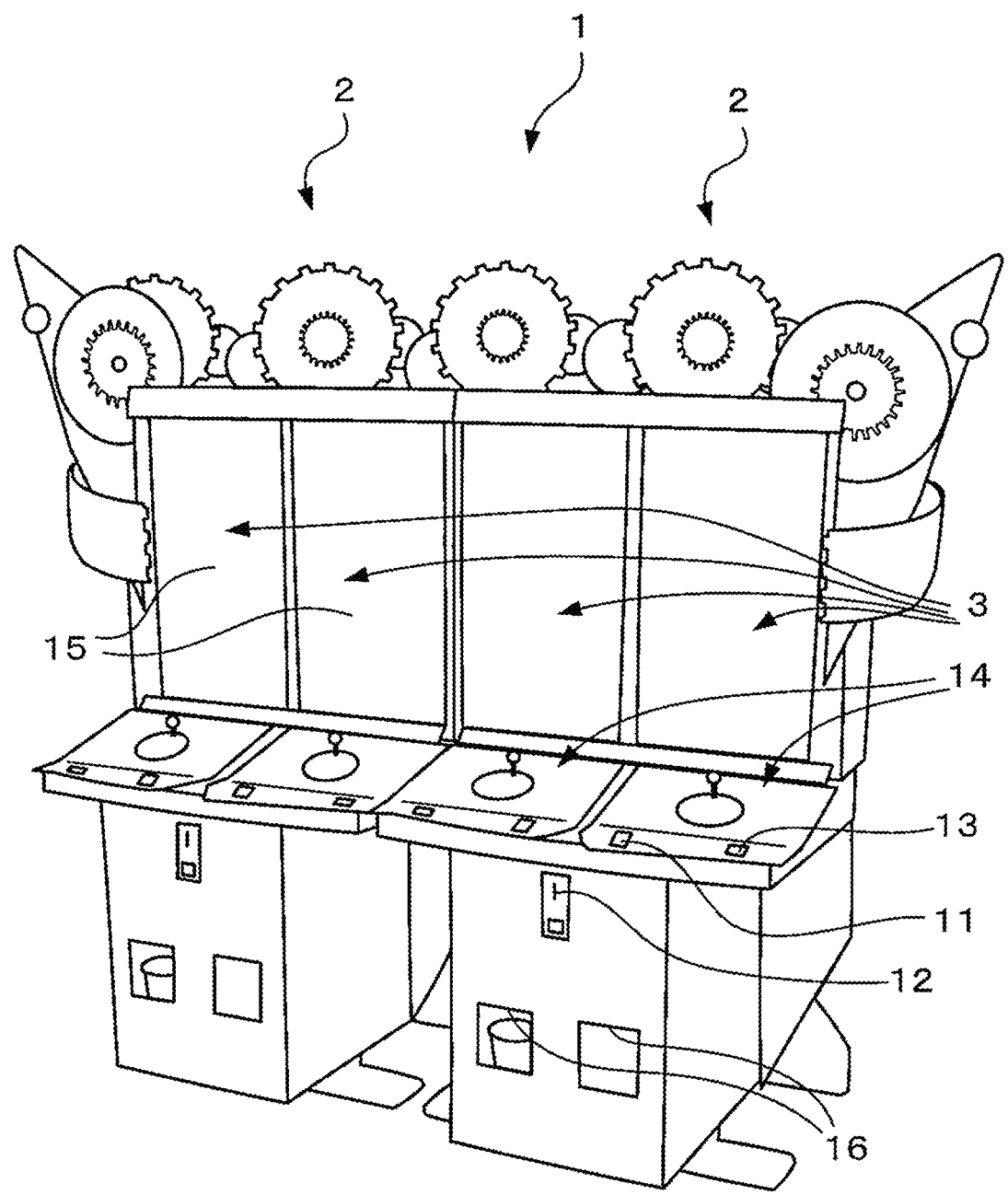
FIG. 1 is an overall perspective view of a game machine to which a game system according to one embodiment of the present invention is applied.

FIG. 1 is an overall perspective view of a game machine 2 where a game system 1 according to one embodiment of the present invention is applied. The game machine 2 is a medal game machine where medals M are used as game value, and a user is allowed to play a predetermined range of a video game in exchange for medals M injected by the user. The game machine 2 is provided with a plurality of station units 3 as a plurality of game-play portions. The plurality of station units 3 are sometimes distinguished from each other, such as a first station unit 3a and a second station unit 3b. Each station unit 3 provides a game-play environment which is required as a place where one player plays a game. Further, the plurality of station units 3 can allow the users to play a common game in communication with each other. In addition, when plural game machines 2 are communicably connected with each other, it is possible to allow the users to play the common game through all of the station units 3. In FIG. 1, two game machines 2 communicably connected with each other are illustrated. Thereby, the common game is available through four station units 3 shown.

Each of the station units 3 is provided with a medal slot 11, a coin slot 12, and a card reading portion 13 which reads out information from a card 17 where a user ID is recorded, an operation portion 14 for playing a game, a monitor 15 as a display device which displays a game screen 100, and a medal payout portion 16 for paying out medals M. The medal slot 11 receives medals M injected by a user. In a game, the medals M injected are converted into credits, and a game range where a user is allowed to play is determined according to the number of credits used by the user. In a case that the user ends the game, the medals M are paid out from the medal payout portion 16 according to the number of credits owned by the user. The coin slot 12 receives predetermined coins, such as 100 JPY coins, injected by the user. The user can buy the medals M according to the injected amount of coins and the bought medals M are converted into credits as they are. Due to this, the user can play the game not via the medals M. The card reading 13 reads out information from the card 17 owned by the user. The game machine 2 is capable of obtaining virtual money information of the user from an account information linked with the user ID, and capable of allowing the user to consume the virtual money to buy the medals M.

Figure 2:
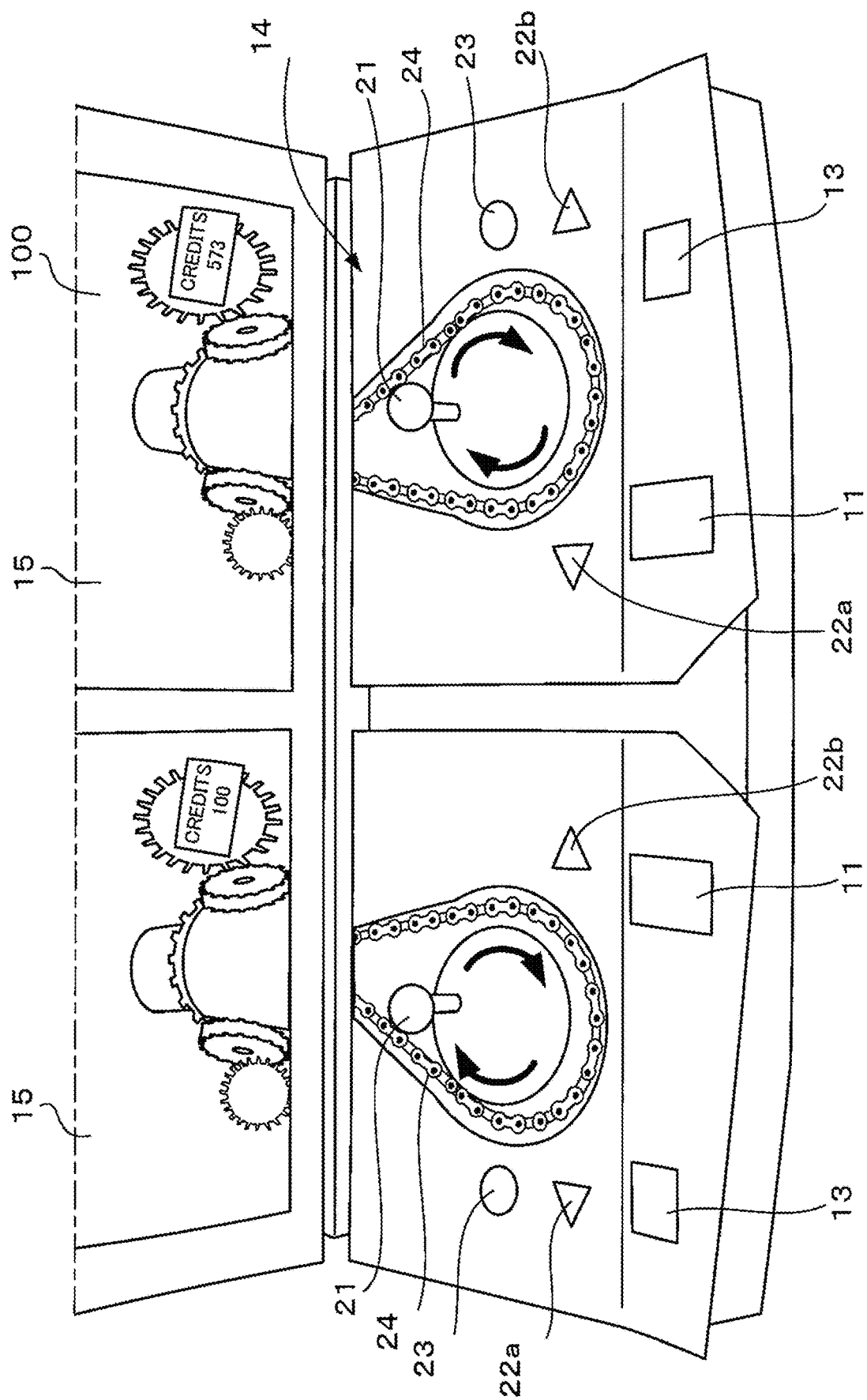
FIG. 2 is an enlarged view of an operation portion.

FIG. 2 is an enlarged view of the operation portion 14. The operation portion 14 is provided with an operation lever 21 allowing the user to perform a rotational operation, a pair of right-left selection buttons 22a and 22b for selecting either left or right, and a determination button 23 for determining selection. The operation lever 21 is capable of rotating in right and left directions. An operation for the game is assigned to each rotational direction. The owned credits are consumed according to the rotational amount of the operation lever 21, and the game is progressed. For example, a shooting game is displayed on the game screen 100, and a user can shoot bullets according to the consumed amount of the credits. A chain 24 is provided to wind around the operation lever 21. According to the rotation of the operation lever 21, the chain 24 rotates. Plural gear images are displayed in the game screen 100. Thereby, it is possible to make a user recognize intuitively an effect on the game caused by his/her rotational operation. Each of the buttons 22a, 22b and 23 is used for environment settings, selections, and determinations for the game. The monitor 15 is possible to be provided so as to be adjacent to the monitor 15 of the other station unit 3. The common game is displayed using all monitors 15 of the station units 3 where the common game is provided at the same time. In a case that plural monitors 15 are provided so as to be adjacent to each other, even if the game is not played at all of the station units 3, the common game is executed using all of the monitors 15.

Figure 3:
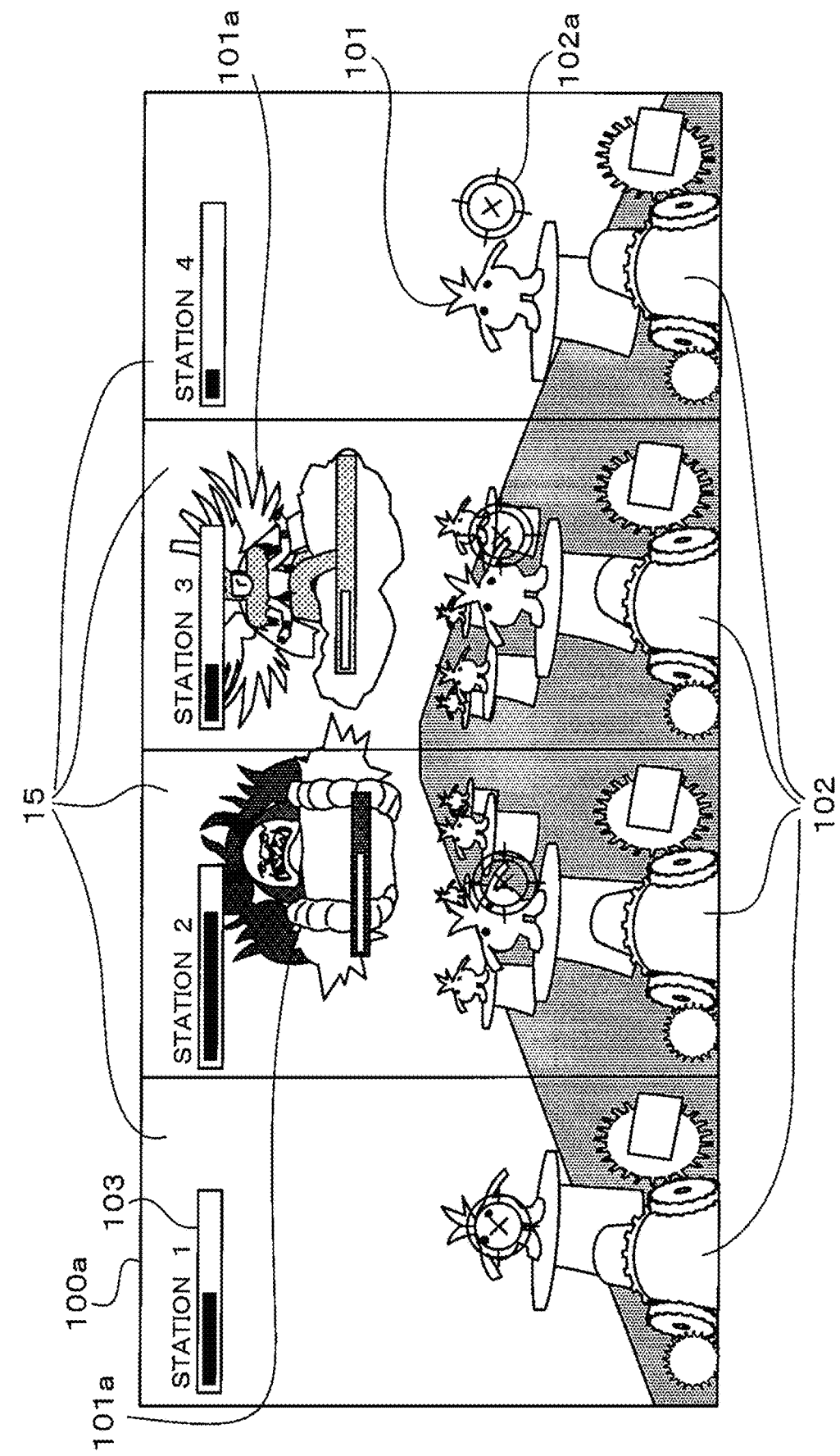
FIG. 3 is a diagram showing one example of a game screen of a normal game.

In reference to FIGS. 3 to 6, the game which is executed at the game machine 2 will be described. FIG. 3 is a diagram showing one example of a game screen 100a of a normal game. In this example, the common game progressing at the same time is displayed using all of the monitors 15 of four station units 3. In the game screen 100a, plural enemy characters 101, cannons 102 which fire bullets, and targetings 102a for bullets are displayed. The user overlaps the targeting 102a on the enemy character 101 with the right-left selection buttons 22a and 22b and rotates the operation lever 21 to shoot. Thereby, the user can defeat the enemy character 101. According to the enemy character 101 defeated, credits are given. According to the credits obtained, a boost gauge 103 increases. When the boost gauge 103 belonging to any one of the users playing the normal game becomes full, a boss event occurs within the normal game.

Figure 4:
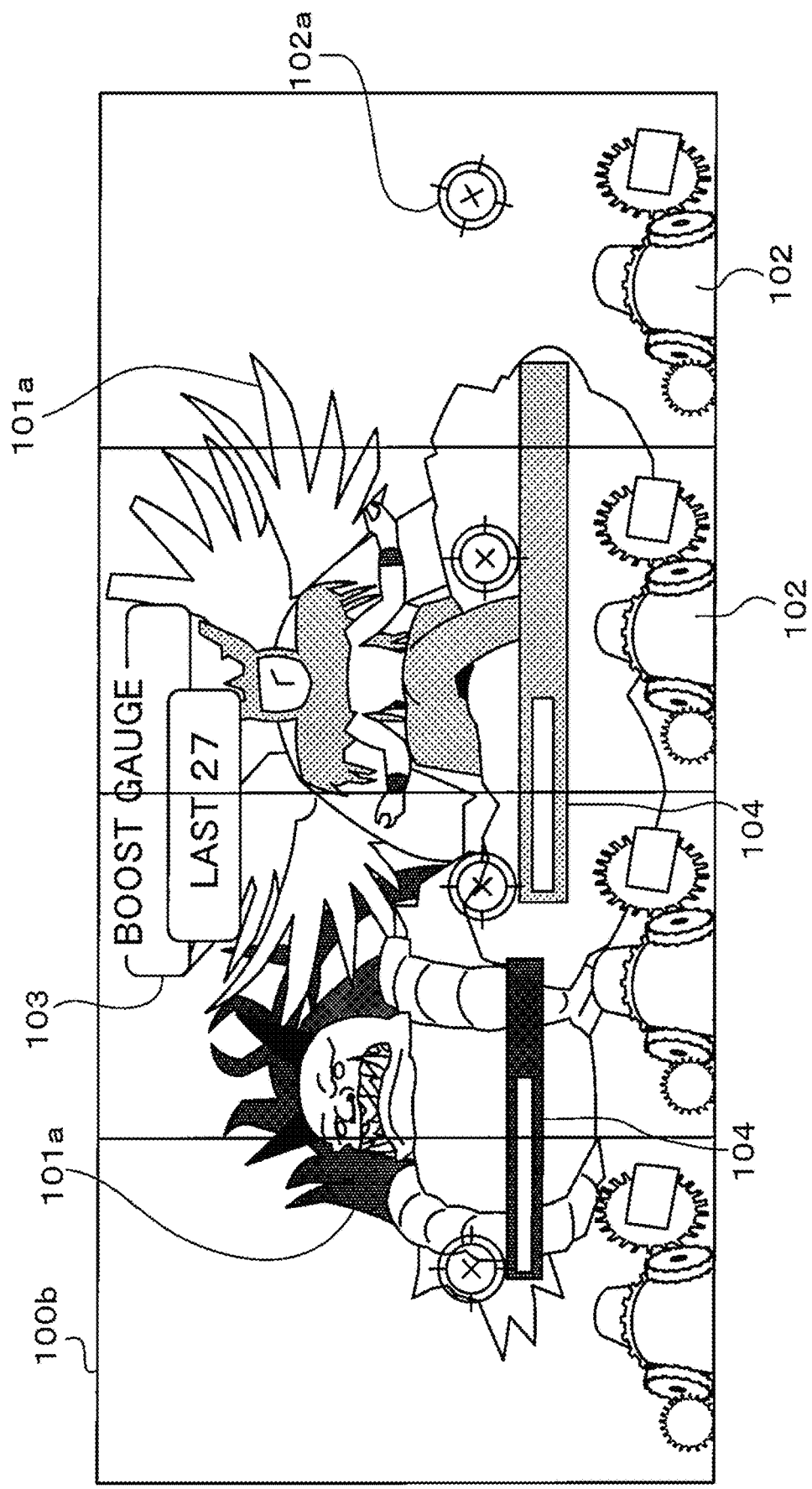
FIG. 4 is a diagram showing one example of a game screen of a boss event.

FIG. 4 is a diagram showing one example of the game screen 100b of the boss event. In the boss event, each player sets the targeting 102a on a boss character 101a to shoot the bass character 101a. According to the shooting result, a power gauge 104 of the boss character 101a decreases. Plural boss characters 101a are displayed in the game screen 100b. If any one of the boss characters 101a is defeated before the boost gauge 103 becomes empty, a bonus game occurs. In the boss event, the boost gauge 103 decreases according to the shootings by the users. In FIG. 4, two of boss characters 101a are shown. Each of the boss characters 101a throws the enemy characters 101 appearing in the normal game and items capable of increasing the boost gauge 103, and the users shoot them. According the shooting effects, the users can increase their credits or the boost gauge 103. Each of the boss characters 101a is linked with a kind of games which is allowed to be played as the bonus game. The bonus game occurs depending on the boss character 101a defeated. If the boost gauge 103 becomes empty, the game system 1 ends the boss event and returns to the normal game. In the game screen 100a of the normal game, though being displayed as shown in FIG. 3, the boss characters 101a do not attack.

Figure 5:
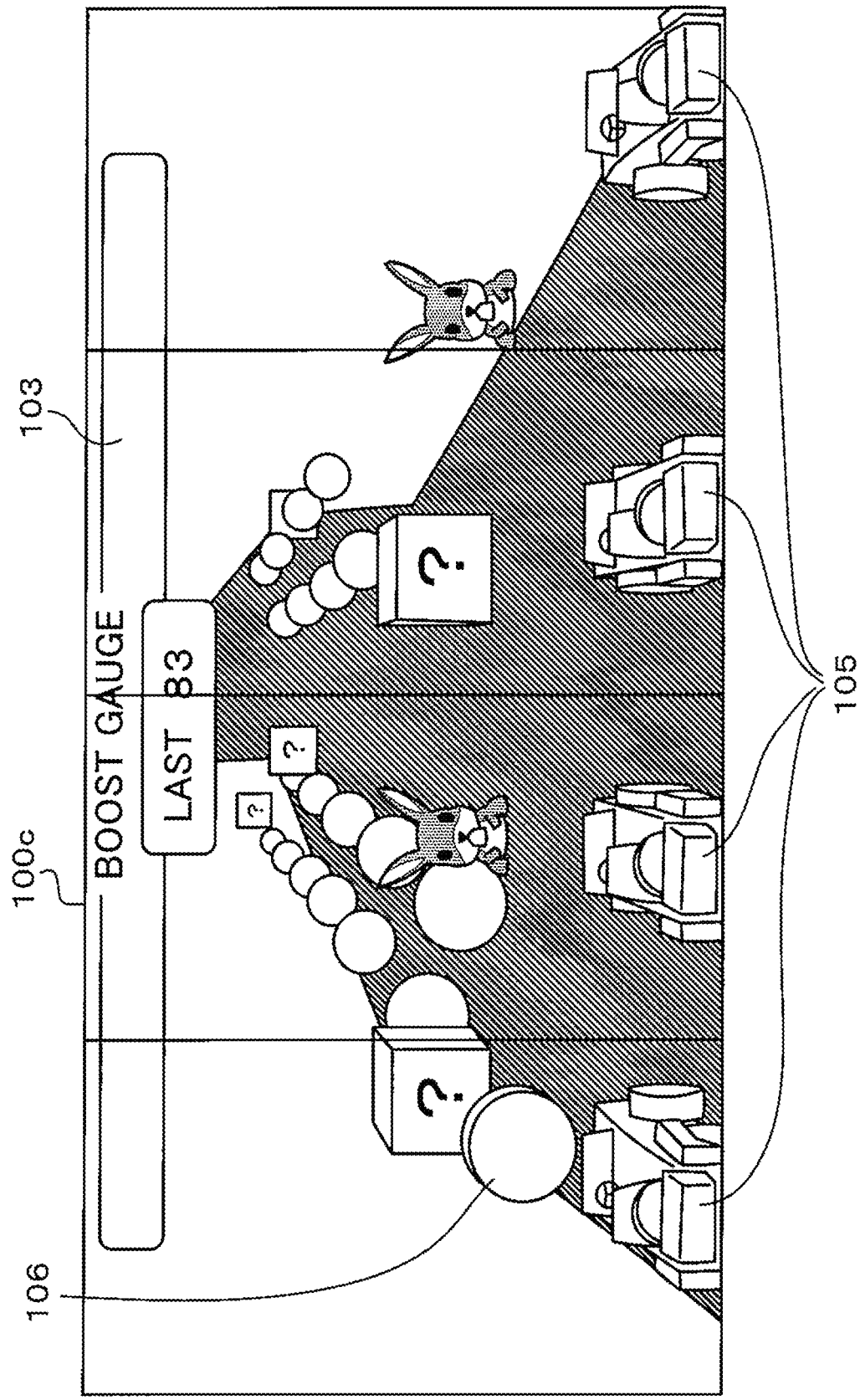
FIG. 5 is a diagram showing one example of a game screen of a bonus game.

FIG. 5 is a diagram showing one example of the game screen 100c of the bonus game. In FIG. 5, as one example of the bonus game, a driving game is shown. In the bonus game, the user operates a vehicle 105 to obtain credits which are displayed at each medal item 106. The user can select a moving direction of the vehicle 105 with the right-left selection buttons 22a, 22b. In the driving game, predetermined check points and a goal are set, and each time when reaching each of them, the user can obtain a reward (credits). In the driving game, the boost gauge 103 decreases according to elapsed time, and the remaining amount of the boost gauge 103 becomes zero, the game system 1 ends the bonus game.

Figure 6:
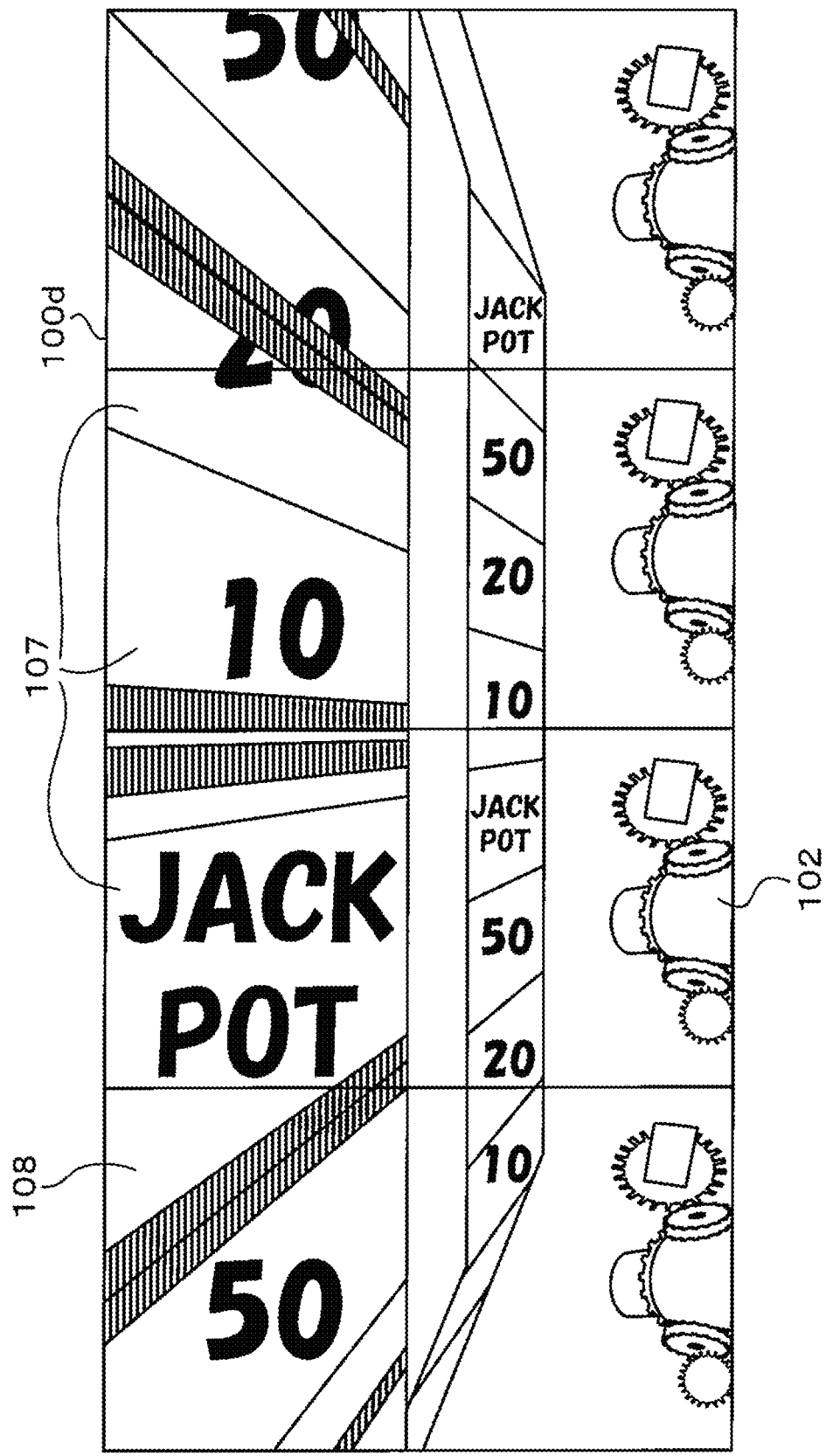
FIG. 6 is a diagram showing one example of a game screen of the other bonus game.

FIG. 6 is a diagram showing one example of the game screen 100d of another bonus game. In FIG. 6, as one example of the bonus game, a roulette game is shown. In the roulette game, a roulette reel 108 rotates, and a user shoots to the roulette reel 108. In the roulette reel 108, some images 107 each showing its reward are arranged. The images 107 are displayed so that one image 107 is assigned to each station unit 3. When one of the images 107 is hit by a single bullet, a value change lottery is executed to change the image 107 so that the reward comes into a high reward, with a predetermined change probability. Each time one of the images 107 is hit by a single bullet, the value change lottery is executed. When the roulette reel 108 stops rotating, the reward is given according to the image 107 corresponding to the station unit 3. The image includes at least one part of design for representing a corresponding prize, numeric characters, and so on.

Figure 7:
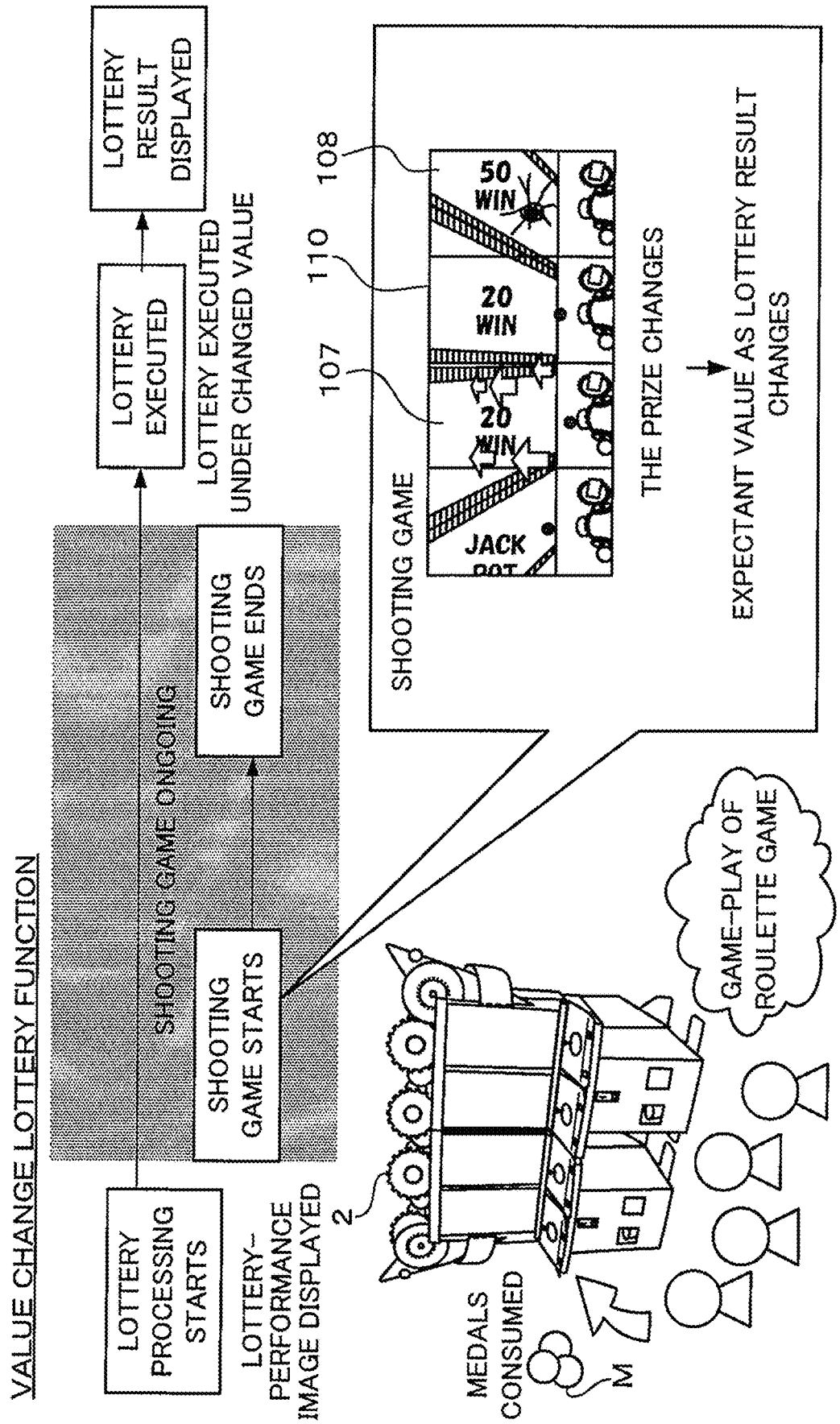
FIG. 7 is a graphic explanation of a value change lottery function provided in the game system.

FIG. 7 is a graphic explanation of a value change lottery function provided in the game system 1. The value change lottery function is a function of: allowing up to 4 users to play the shooting game in the roulette game shown in FIG. 6; changing a value that the users can expect (hereinafter, the expectant value) as a lottery result by changing the image 107 shown on the roulette reel 108 depending on a game-play state of the shooting game; and executing the lottery with the roulette reel 108 changed. The shooting game is executed at least one portion in a period between start of the roulette game to execution of the lottery. In the shooting game, when one of the images 107 shown in the roulette reel 108 is shot, the shot image 107 is changed with a predetermined change probability. The shooting game is allowed to be played in a predetermined period, and the lottery is executed with the roulette reel 108 showing the images 107 at a moment of end of the shooting game.

By allowing a user to play the shooting game in a process of lottery processing, the expectant value as the lottery result is changed depending on the game-play state. Thereby, it is possible to present comprehensibly processes of lottery processing to a user. Further, it is possible to allow in the process of the lottery processing, a user to execute actions for affecting the lottery result. It is possible to heighten user's expectation with respect to the lottery result, and also heighten an amusementability of the game.

In this specification, "the expectant value as the lottery result" is a value determined by a value of each of plural lottery candidates and a lottery probability of each lottery candidate. That is, "the expectant value as the lottery result" includes a conception which indicates how much a value a user can expect by the lottery is. FIG. 8 is a graphic explanation of the expectant value as the lottery result. The expectant value will be explained with using as an example, dividend tables T1 to T3 for credits which can be obtained as the reward in the lottery executed in the roulette game mentioned above. Using the dividend table T1 as a basis, the dividend table T2 is a table where a change has been made to a lottery candidate of the dividend table T1, and the dividend table T3 is a table where a change has been made to lottery probabilities of the dividend table T1.

In the dividend table T2, the image A has been replaced with the image A' so that the reward of credits increases. Thereby, an expected value of the reward of credits has become higher than an expected value of the dividend table T1 used before the change. In the dividend table T3, the lottery probability of the image A has been changed so as to be made higher. In response to this change, the remaining lottery probabilities of the images B to D are changed so as to be made lower. Thereby, an expected value of the reward of credits of the dividend table T3 is made higher than an expected value of the dividend table T1 used before the change. In this way, when the lottery result is only a dividend of credits, the expectant value as the lottery result can be dealt with mathematically, and may be equal to an expected value. The embodiment that the change is made to the lottery possibilities like the dividend table T3 will be explained later.

Figure 9:
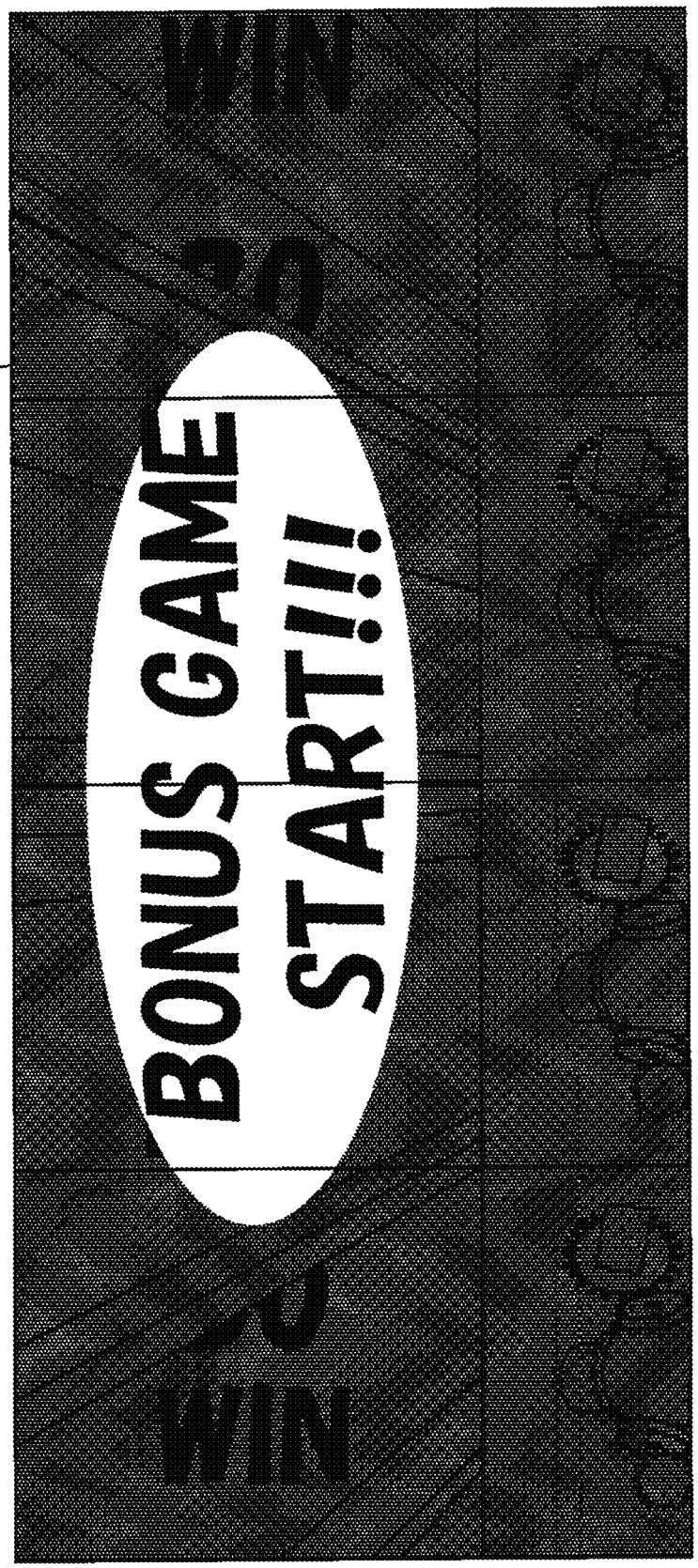
FIG. 9 is a diagram showing one example of a game screen of a roulette game.
Figure 10:
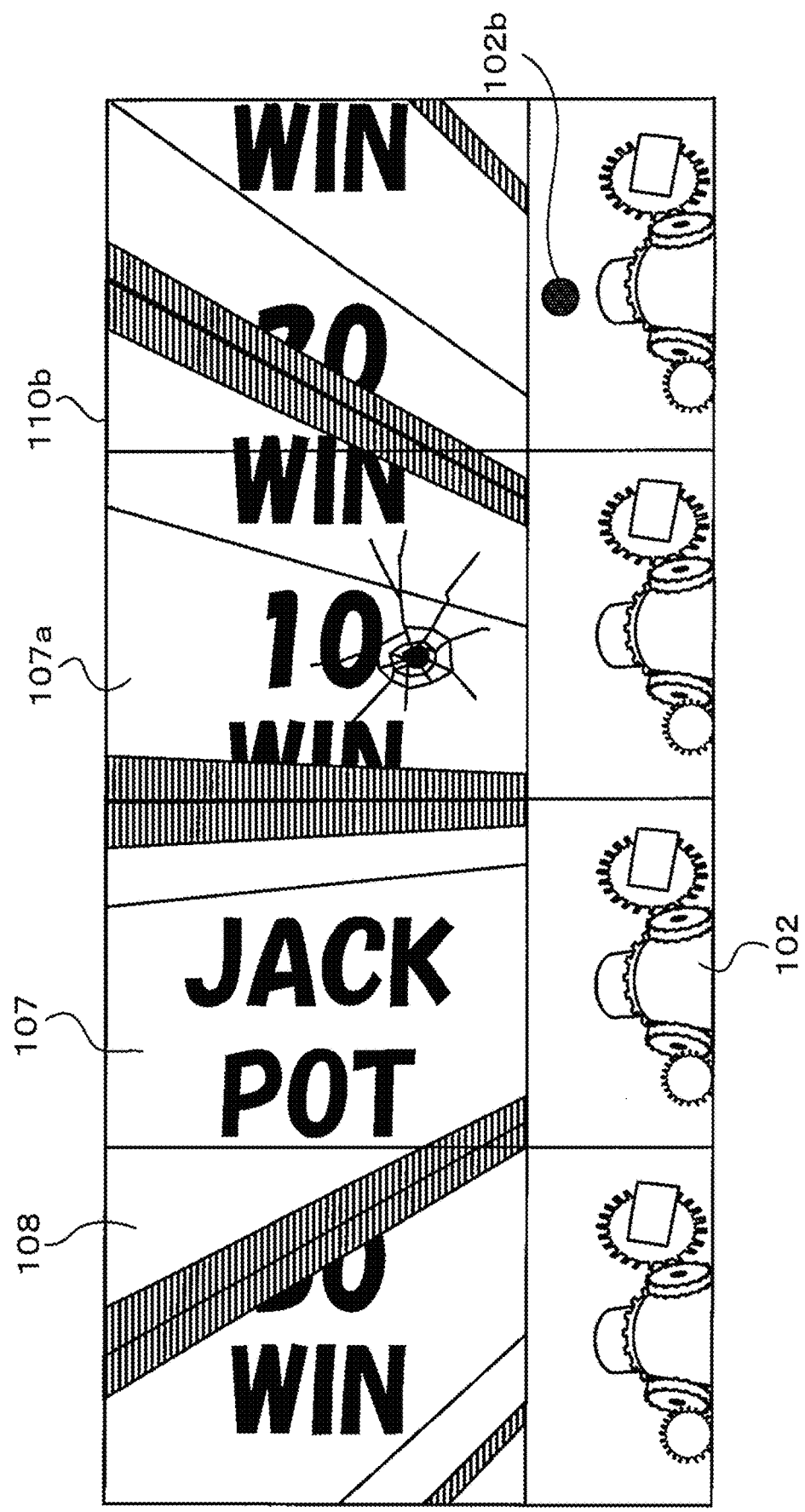
FIG. 10 is a diagram showing one example of a game screen of the roulette game following FIG. 9.

FIGS. 9 to 13 are diagrams showing the game screens 110a to 110e respectively for further explanation of the roulette game. FIG. 9 is a diagram showing one example of the game screen 110a of the roulette game. In a case any one of the game screens 110a to 110e is not specified as a game screen of the roulette game, a reference sign "110" is sometimes used as a representative one. The game screen 110a shown in FIG. 9 shows one example of performance for informing users that the roulette reel 108 is going to rotate when the roulette game is started. When the performance for game start is completed, the roulette reel 108 rotates and the game progresses. FIG. 10 is a diagram showing one example of the game screen 110b of the roulette game following FIG. 9. A user can play the shooting game in a predetermined period. In the shooting game, the user is allowed to operate the operation lever 21 in exchange of consumption of his/her credits to shoot the bullet 102b from the cannon 102. The shot bullet 102b hits any one of the images 107 of the roulette reel 108. When the bullet 102b hits the roulette reel 108, the value change lottery is executed with respect to the mage 107 existing at a position hit by the bullet 102b.

The value change lottery is executed under the condition that the bullet 102b has hit any one of the images 107, that is, the user uses his/her credits. The image 107 hit by the bullet 102b is changed with a predetermined change probability. With respect to a change of the image 107 where the expected value rises at a comparatively large increase range, a comparatively low probability is set as the change probability, and with respect to a change of the image 107 where the expected value rises at a comparatively small increase range, a comparatively high probability is set as the change probability. As one example, in a case where when the bullet 102b hits the image 107a indicating a 10-credit dividend, the image 107a is replaced with the image 107b indicating 20-credit dividend with a predetermined change probability, the expected value rises by 2.5 in consideration of a fact that each of four images of the roulette reel 108 is selected with an equal probability to each other. Further, in a case when a bullet 102b hits an image 107 indicating 50-credit dividend, and the image 107 is replaced with the other image indicating 150-credit dividend with a predetermined change probability, the expected value rises by 25 in consideration of a fact that each of four images of the roulette reel 108 is selected with an equal probability to each other. In such a case, the change probability for replacing the image 107a indicating the 10-credit dividend with the image 107b indicating the 20-credit dividend is set so as to be ten times higher than the change probability for replacing the image 107 indicating the 50-credit dividend with the image 107 indicating the 150-credit dividend. Concretely, it can be considered that the former change probability is set to 40% and the later one is set to 4%.

Figure 11:
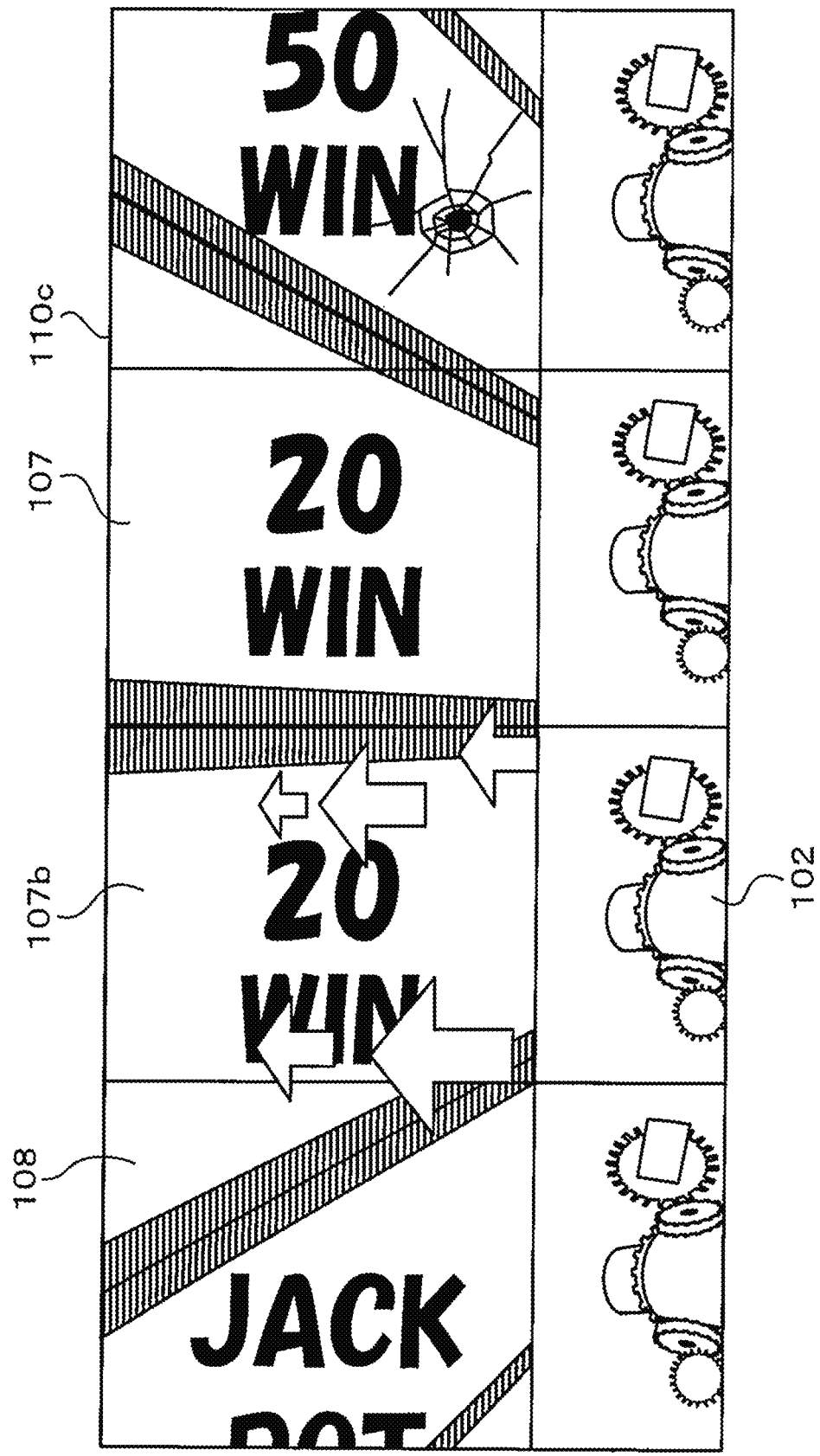
FIG. 11 is a diagram showing one example of a game screen of the roulette game following FIG. 10.
Figure 12:
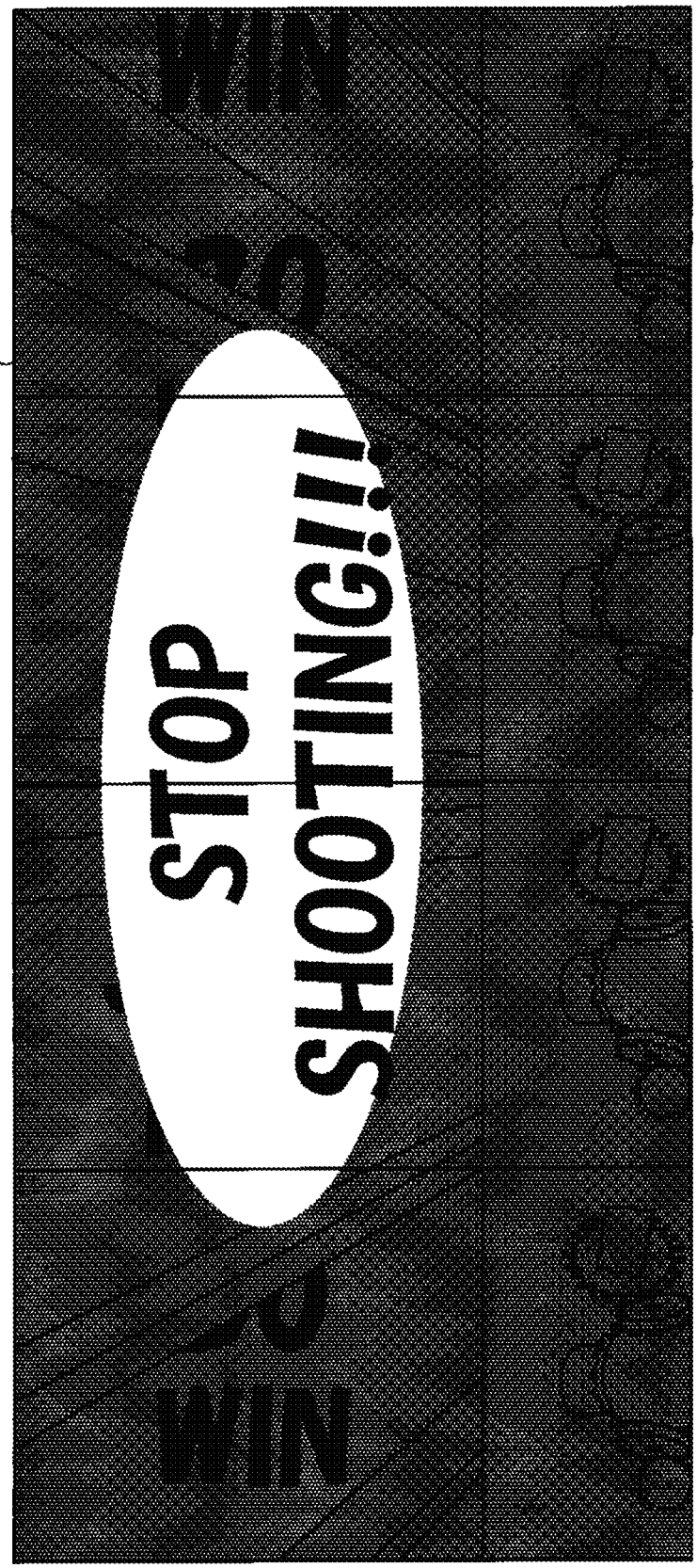
FIG. 12 is a diagram showing one example of a game screen of the roulette game following FIG. 11.
Figure 13:
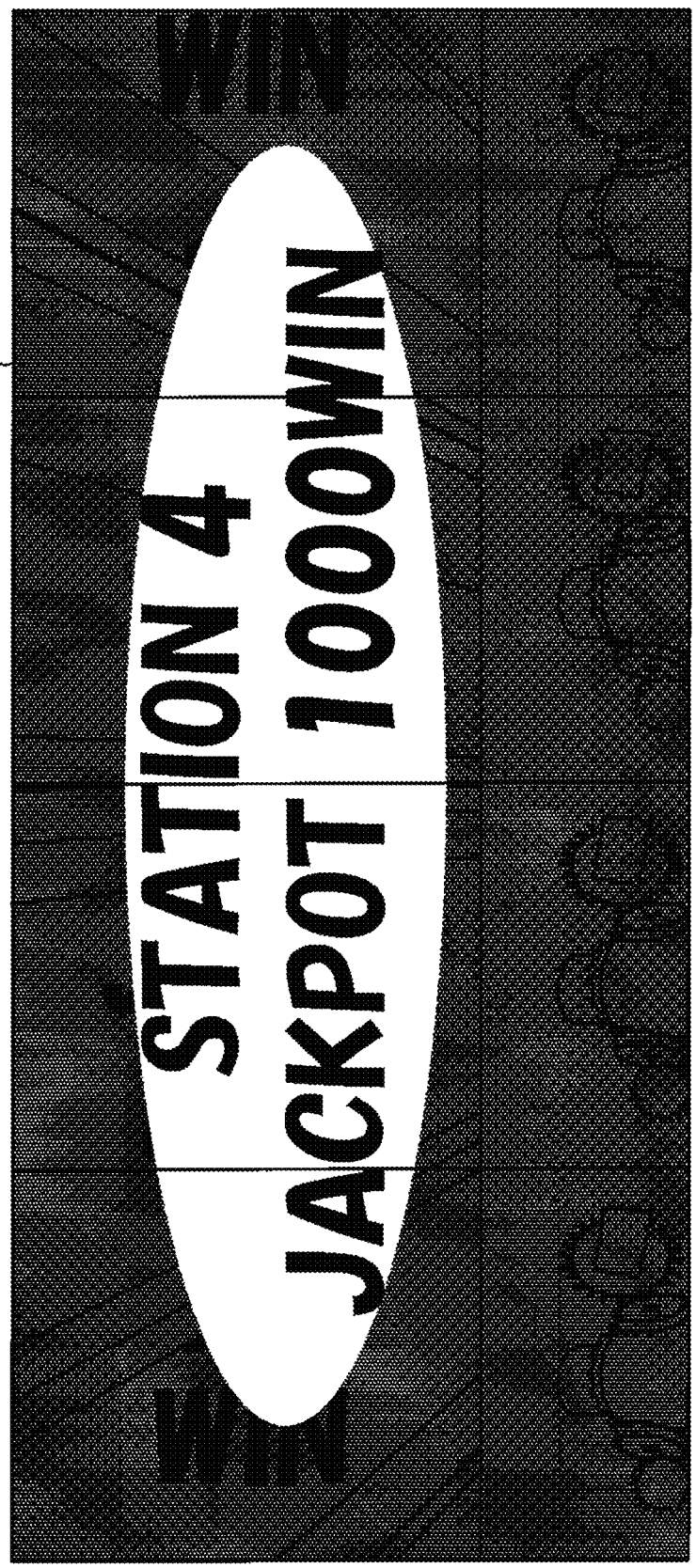
FIG. 13 is a diagram showing one example of a game screen of the roulette game following FIG. 12.

FIG. 11 is a diagram showing one example of the game screen 110c of the roulette game following FIG. 10. When the change of the image 107a is selected by the value change lottery, the image 107a is replaced with the image 107b. At this moment, a change performance is executed for replacing the image 107a with the image 107b. The value change lottery is executed each time when each user shoots the image 107, and the shot image 107 is changed with the predetermined change probability. While the change performance is executed, operations by the users may be restricted. FIG. 12 is a diagram showing one example of the game screen 110d of the roulette game following FIG. 11. The shooting game is ended after being played in a predetermined time. Alternatively, the number of bullets 102b allowed to be shot is set, and the shooting game may be ended when all of the bullets 102b have been used up. After the shooting game is ended, the images 107 of the present roulette reel 108 are settled, the lottery is executed based on the combination of the images 107. FIG. 13 is a diagram showing one example of the game screen 110e of the roulette game following FIG. 12. The lottery result is displayed on the monitors 15, the reward is given to each user based on the lottery result. After that, the game system 1 ends the roulette game and returns to the normal game. Each of the game screens 110a to 110e corresponds to the lottery-performance image.

Figure 14:
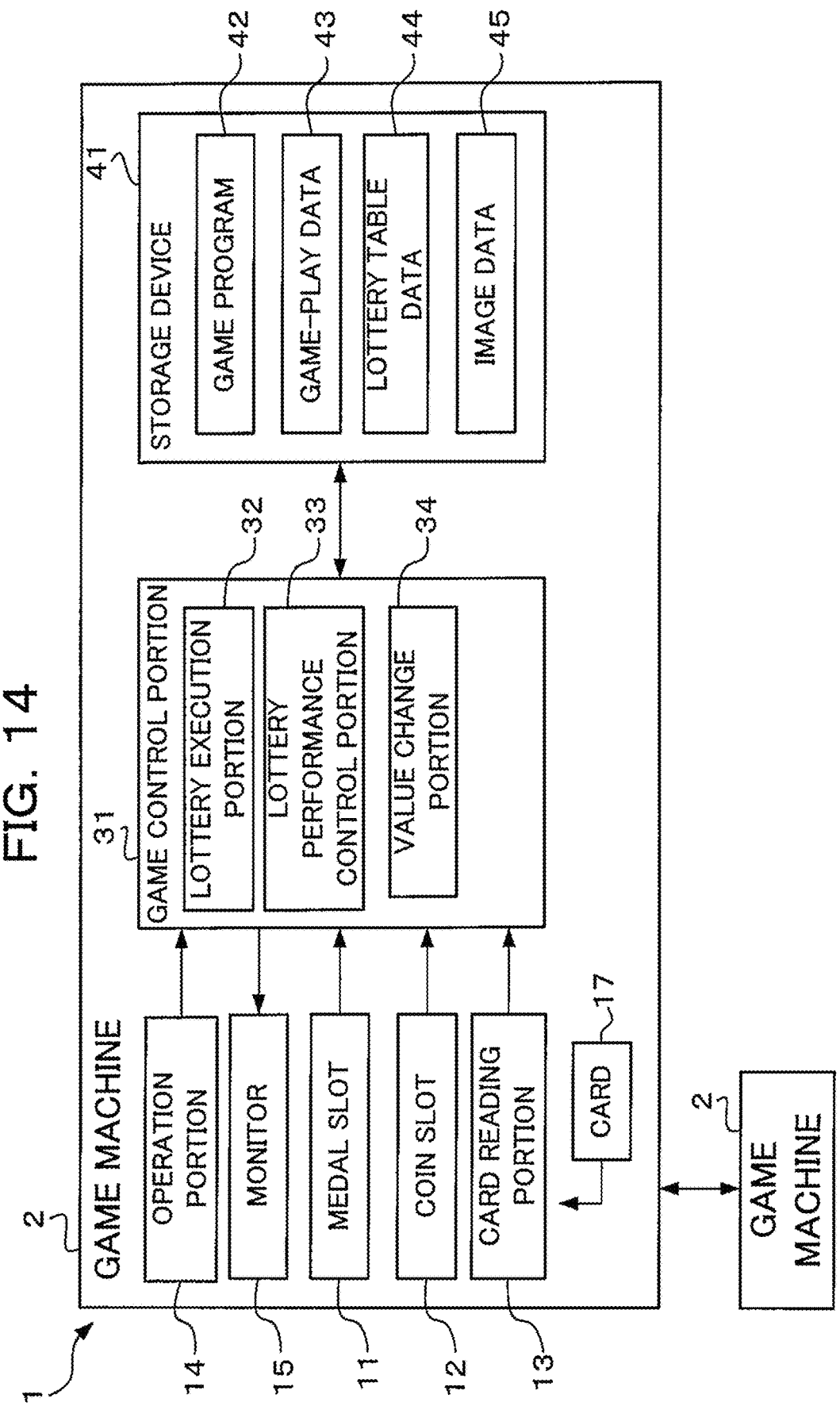
FIG. 14 is a functional block diagram showing a configuration of a main portion of a control system of the game system.

FIG. 14 is a functional block diagram showing a configuration of a main portion of a control system of the game system 1. In the game system 1, two game machines 2 are communicably connected to each other. A computer unit of each game machine 2 is provided with a game control portion 31 as a logical device which is realized by a combination of computer hardware and predetermined software. The computer unit comprises a microprocessor and an internal storage device (not illustrated) including a ROM where programs for an operating system and the like which are executed by the microprocessor, a RAM which provides a working area for the microprocessor, and the like. The game control portion 31 executes various kinds of processing relating to game-play of an arcade game, such as control for game start, game progress, and game end; control for injecting of ejecting medals; and control for collection of the game-play fee at the game machine 2.

The game control portion 31 controls the normal game. The game control portion 31 is provided with: a lottery execution portion 32 which executes a lottery by the roulette game; a lottery-performance control portion 33 which executes the performance of the roulette game including the shooting game; and a value change portion 34 which makes a change to the images 107 in the shooting game. To the game control portion 31, connected are the medal slot 11, the coin slot 12, the card reading portion 13, the operation portion 14, and the monitor 15.

The game machine 2 is provided with a storage device 41. In the storage device 41, stored are a game computer program 42, game-play data 43, lottery table data 44, and image data 45. The game computer program 42 is executed by the computer unit, and thereby configured to provide a game possible to be played at the game machine 2. In the game-play data 43, data of a game played by a user is recorded. A user ID recorded in the card 17 of a user is read out with the card reading portion 13, and after the game control portion 31 verifies the user, the game-play data 43 may be obtained from a server holding user information.

FIG. 15 is a diagram showing one example of the lottery table data 44. In the lottery table data 44, each image 107 to be set on the roulette reel 108 of the roulette game and the lottery probability thereof are set so as to be linked with each other. In the roulette game, the four images 107 are set on the roulette reel 108 and revolved in a predetermined sorting order. Each station unit 3 wins any one of the images 107. The images 107 set on the roulette reel 108 are selected from the image data 45. According to the lottery table data 44 of FIG. 15, four images 107 are set on the roulette reel 108. However, the setting of images 107 is not limited to this embodiment, and the following embodiment may be applied: more number of images 107 are selected and set on the roulette reel 108; a combination of images 107 each being assigned to each station unit 3 is determined depending on the sort order of the images 107. In this case, a weight may be given to a lottery probability of each combination. The lottery probability is set using random numbers generated in the computer. FIG. 16 is a diagram showing one example of the image data 45. In the image data 45, each image 107 to be set on the roulette reel 108 and the reward thereof are set so as to be linked with each other.

Figure 17:
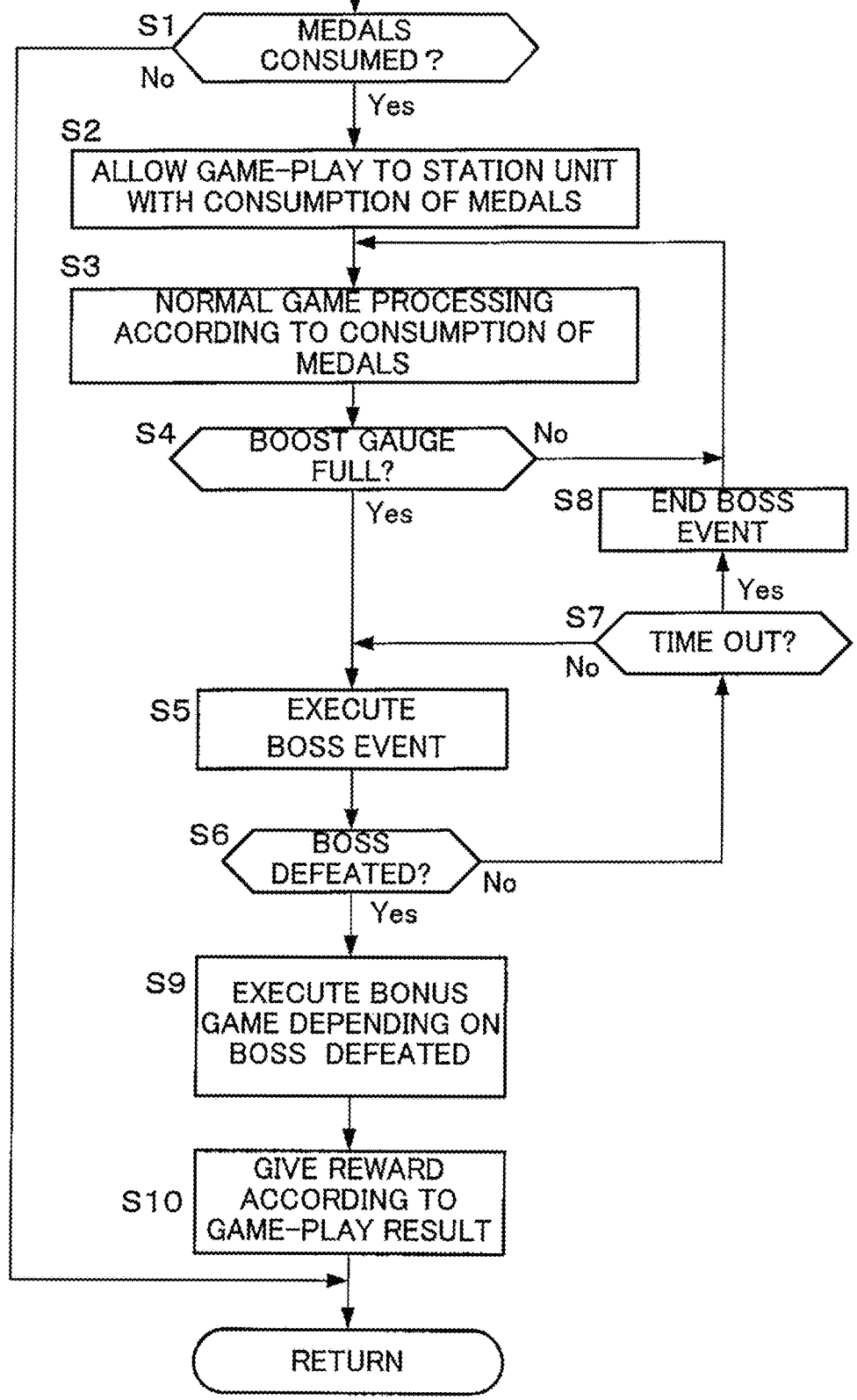
FIG. 17 is a flowchart showing a normal-game control routine executed by the game control portion.

FIG. 17 is a flowchart showing a normal-game control routine executed by the game control portion 31. In processing of the normal-game control, a game flow relating to the normal game is controlled. The game control portion 31 determines whether the medals M have been consumed (step S1). The game control portion 31 determines whether medals M have been injected into the medal slot 11, or medals M have been bought by coins injected into the coin slot 12 and the medals M converted to credits have been consumed as credits. In a case that the medals M have been consumed, the game control portion 31 allows the user to play the normal game at the station unit 3 where medals M have been consumed (step S2) and executes the normal game control depending on the consumed amount of the medals M (step S3). In the game machine 2, the injection and payout of medals M are controlled for each station unit 3. In association with the consumption of medals M, it is determined independently whether the user should be allowed to play the normal game.

While the normal game progresses, the game control portion 31 determines whether the boost gauge 103 has become full (step S4). When the boost gauge 103 has not yet become full, the game control portion 31 returns to step S3 to continue the processing of the normal game. When the boost gauge 103 has become full, the game control portion 31 executes the boss event (step S5). While the boss even is executed, the game control portion 31 determines whether any one of the boss characters 101a has been defeated (step S6). When no boss character 101a has been defeated, the game control portion 31 continues the boss event for a predetermined period. Then, when the period for the boss event has passed (step S7), the game control portion 31 ends the boss event (step S8) and returns to step S3 to resume the normal game.

When any one of the boss characters 101a has been defeated, the game control portion 31 executes a bonus game depending on the boss character 101a defeated (step S9). Only one bonus game may be set, or a plurality of bonus games may be set. In a case that a single boss character 101a is set, when the boss character 101a has been defeated, one bonus game to be executed may be selected at random. After the bonus game ends, the game control portion 31 gives rewords according to the game-play result (step S10), and ends the processing of the present routine.

Figure 18:
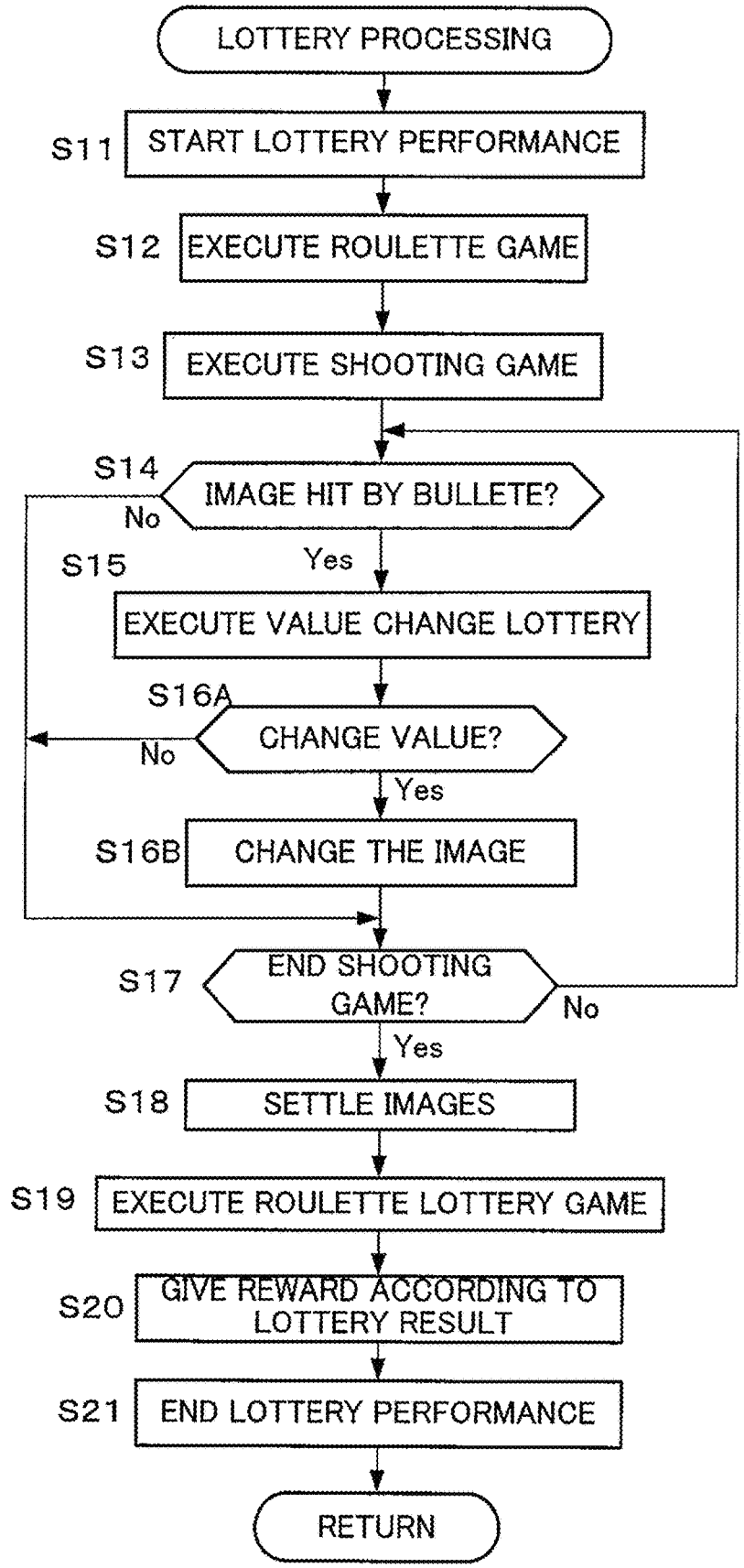
FIG. 18 is a flowchart showing a lottery processing routine executed by the game control portion.

FIG. 18 is a flowchart showing a lottery processing routine executed by the game control portion 31. The lottery processing is processing for controlling the roulette game within the bonus games of step S9 shown in FIG. 17. When the roulette game is selected at step S9, the game control portion 31 executes a performance for starting the lottery by the roulette game (step S11). As one example, the game control portion 31 displays the game image 110a shown in FIG. 9 on the monitor 15 to inform the users of start of the lottery with the roulette reel 108. The game control portion 31 executes the roulette game (step S12). The game control portion 31 executes a performance where the roulette reel 108 is rotated. Subsequently, the game control portion 31 executes the shooting game (step S13). The game control portion 31 accepts a game-play operation to the cannon 102, and according to the game-play operation by each user, executes a performance where the bullet 102b is shot as shown by the game image 110b in FIG. 10.

The game control portion 31 determines whether a bullet 102b has hit one of the images 107 (step S14). As a game condition which is a trigger for executing the value change lottery, it is set that the bullet 102b has hit one of the images 107, that is, the user has consumed his/her credits to shoot the bullet 102b. In a case that the bullet 102b has hit one of the images 107, the game control portion 31 executes the value change lottery (step S15). Each time when the bullet 102b hits the image 107, the value change lottery is executed. In the value change lottery, it is determined whether the image 107 which has been hit is changed with a predetermined change probability. The change probability is set depending on a matter to be changed of the corresponding image 107. The game control portion 31 determines whether the change of the image 107 has been selected as the result of the value change lottery (step S16A). In a case that the change of the image 107 has been selected, the game control portion 31 replaces the image 107 with the other image 107 (stepS 16B). As shown by the game screen 110c in FIG. 11, a performance for replacing the image 107 with the image 107b is executed. On the other hand, in a case that it is determined that the bullet 102b has not hit the image 107, the game control portion 31 goes to step S17.

Subsequently, the game control portion 31 determines whether the shooting game has ended (step S17). In a case that the shooting game has not yet ended, the game control portion 31 returns to step S14, and repeats the processing of step S14 and processing following step S14. In addition, also in a case that the value is changed at step S16A, the game control portion 31 returns to step S14. In a case that the shooting game has ended, the game control portion 31 settles the images 107 displayed at the present as images 107 used for the roulette lottery (step S18). As shown by the game screen 110d of FIG. 12, at the moment when a performance for end of the shooting game is executed, the images 107 are settled.

The game control portion 31 executes the roulette lottery (step S19). The roulette lottery generates a random number inside the computer, and is executed based on the lottery table data 44 and the image data 45. The game control portion 31 stops the rotation of the roulette reel 108, and executes a performance for letting the users know the lottery result as shown by the game screen 110e in FIG. 13. The game control portion 31 delivers the rewards according to the lottery result to the station units 3 respectively (step S20). Then, the game control portion 31 executes a performance for end of the roulette game (step S21), and ends the processing of the present routine.

According to the above mentioned processing, while the roulette game is being executed (step S12), the shooting game is further executed (step S13) and thereby a chance of playing the shooting game is given to a user. Since the image 107 is changed depending on the game state (steps S14 to S16), the expectant value as the lottery result is changed. When the shooting game ends, the images 107 being displayed after the change executed depending on the game state are settled (step S18), and the roulette lottery is executed (step S19). Accordingly, the users can get involved in information about inside processing in a positive manner. The expectant value as the lottery result change is continuously changed based on the involvement of the users. It is possible to allow users, in the process of the lottery performance, to get involved in the information of the inside processing of the lottery, and affect the lottery result. Thereby, it is possible to enhance a degree of expectation of users to the lottery result and an amusementability of the game.

The game control portion 31 functions as the lottery execution portion 32 by executing steps S19 and S20. The game control portion 31 functions as the lottery-performance control portion 33 by executing steps S11 to S21. The game control portion 31 functions as a value change portion 34 by executing steps S14 to S16. In particular, the game control portion 31 functions as the lottery-performance control portion 33 by executing steps S13 to S17, and functions as the value change portion 34 by executing steps S15 and S16.

Figure 19:
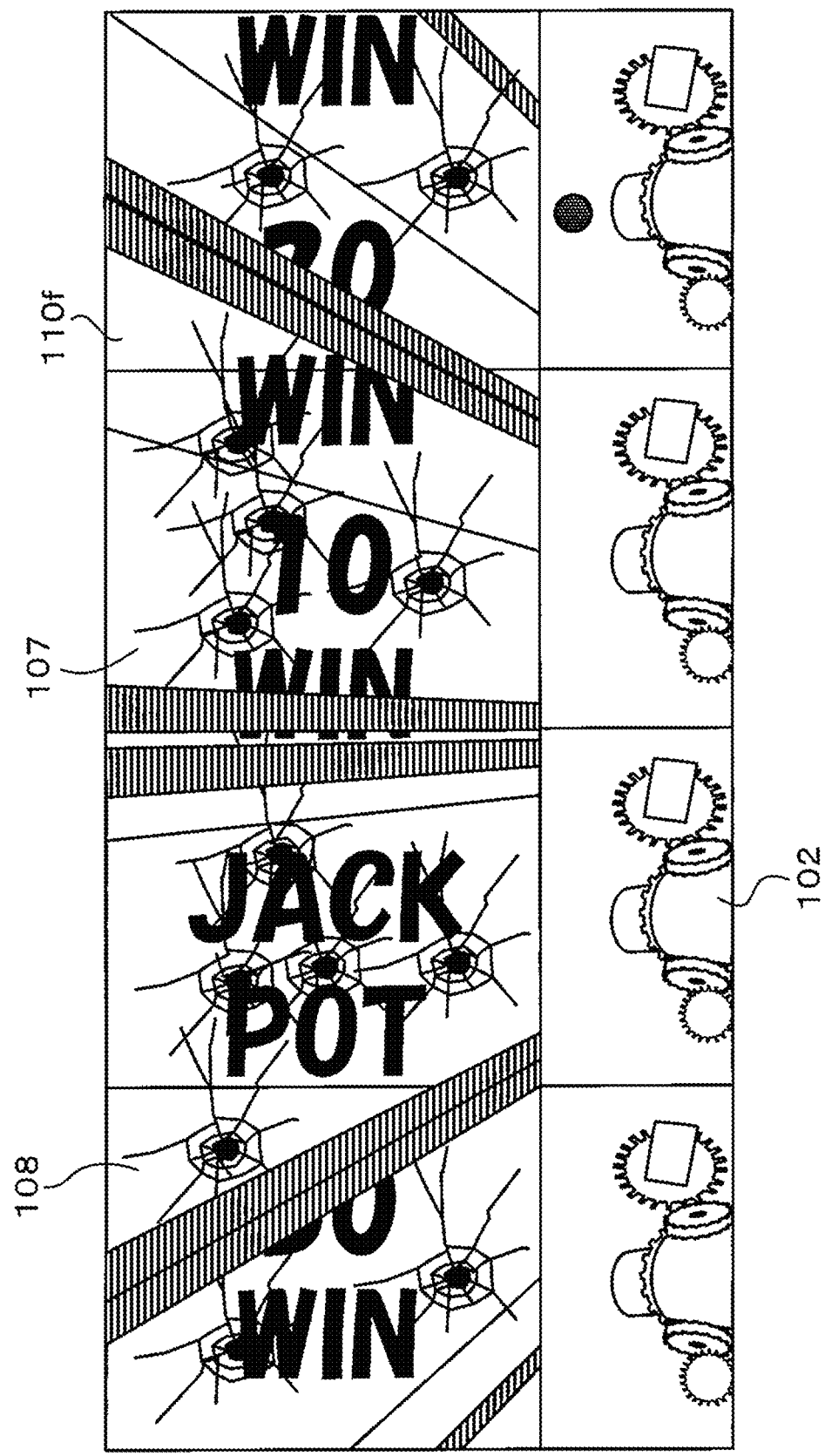
FIG. 19 is a diagram showing one example of a game screen when a batch conversion of images is executed in the roulette game.
Figure 20:
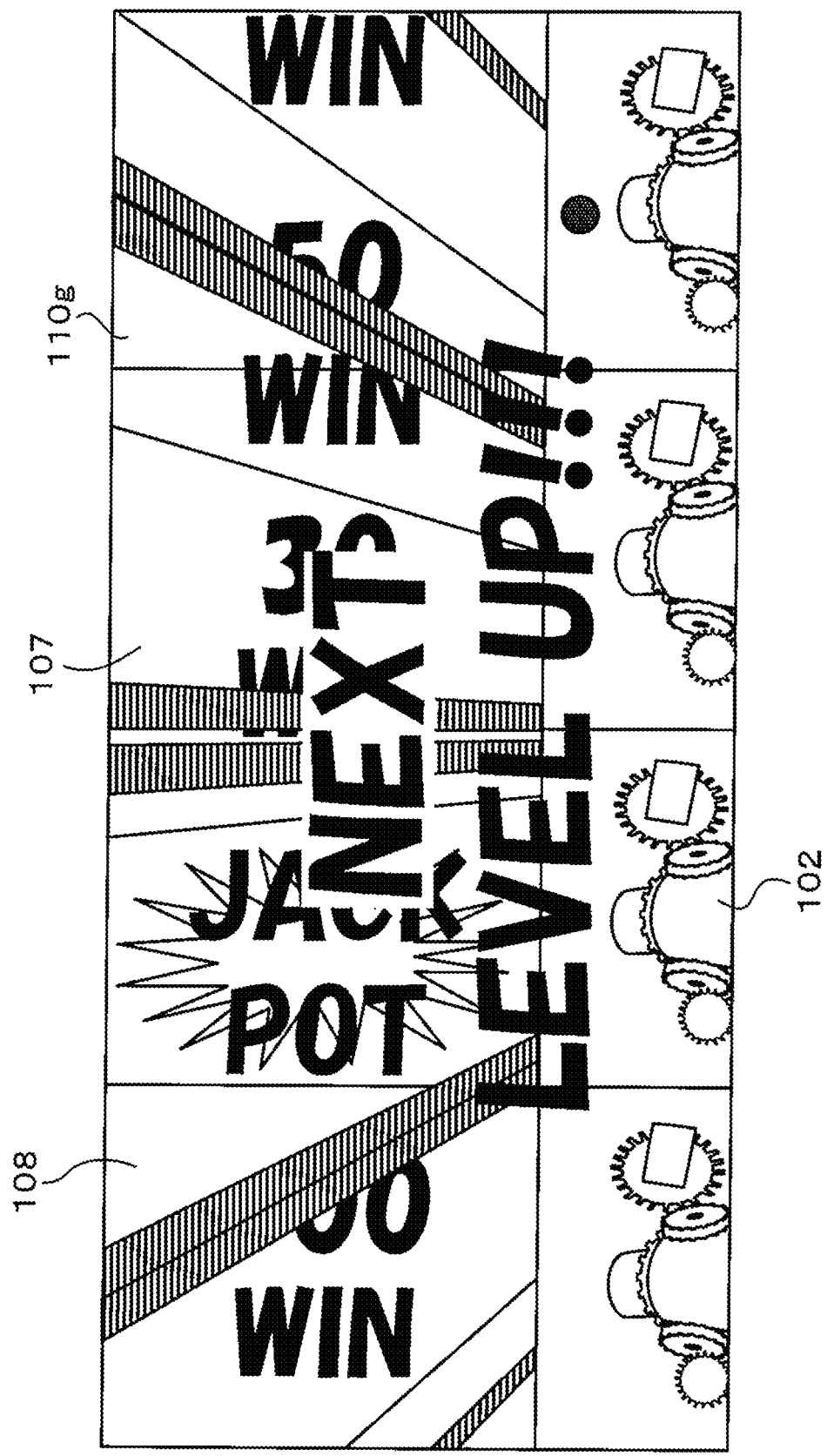
FIG. 20 is a diagram showing one example of a game screen of the roulette game following FIG. 19.

The present invention is executed not only in an embodiment limited to the above embodiment, but also in various kinds of embodiments. For example, in the above embodiment, in a case that a bullet 102b hits an image 107 the hit image 107 is replaced with the other image 107 in the shooting game. However, the present invention is not limited to this embodiment. For example, the change may be made together to all of the images 107 set on the roulette reel 108. FIG. 19 is a diagram showing one example of a game screen 110f displayed at a moment when the change is made together to the images 107. In this case, a whole of the roulette reel 108 can receive a bullet 102b, and each time when the bullet 102b hits the roulette reel 108, the value change lottery of step S15 of FIG. 18 is executed. The change is made to all of the images 107 together with a predetermined change probability. When the change of the expectant value as the lottery result is selected, the change may be made together to the images 107 as shown by a game screen 110g in FIG. 20. Alternatively, while the images 107 are sustained, the lottery probabilities of the images 107 may be changed together. For example, with respect to one part of the station units 3, the lottery probability corresponding to a jack pot image 107 may be increased, and the lottery probabilities corresponding to the other images 107 may be decreased. As the one part of the station units 3, for example, it can be considered to select a station unit 3 being used by a user who has made a lot of bullets 102b hit the roulette reel 108.

In the above mentioned embodiment, in the roulette game, the shooting game is further executed. However, the present invention is not limited to this embodiment. The following embodiment may be also applied: a chance of playing any kind of game occurs in the roulette game; and depending on the game state the expectant value is changed. Further, it is enough that in a period which is at least one portion of time while the roulette game is being executed, a chance of playing the other game is provided. Accordingly, the other game may be executed before start of the roulette game, and may be executed continuously following the end of the roulette game. In this case, the expectant value may be changed depending on the game-play state of the other game being executed while the roulette game is being executed.

The above mentioned embodiment is explained using an example that the user is allowed to shoot a bullet 102b to hit an image 107 by consuming his/her credits in the shooting game. However, the present invention is not limited to this embodiment. It is not necessary that the bullet 102b, shot from the cannon 102 in response to the consumption of credits, hits an image 107. In this case, it is set as a game condition, that the bullet 102b hits an image 107 instead of the consumption of credits. This condition enhances a game property.

Instead of the shooting game, an action game may be executed. In this case, as the game condition which is the trigger for executing the value change lottery, each time when a predetermined mission has been cleared, or when a predetermined points have been obtained, the value change lottery may be executed. Alternatively, the consumption of credits may be set as the game condition. Instead of the shooting tame, any game, such as a quiz game or a music game, may be applied. Further, the roulette game is used as an example for explaining the lottery processing, in the above embodiment. However, the present invention is not limited to this embodiment. Any game can be applied to the present invention, as long as the game includes lottery processing where at least one lottery candidate is selected from a plurality of lottery candidates, such as a slot game where a plurality of reels rotates, and a card game such as a poker and a concentration, and the like.

Alternatively, instead of the roulette game, the present invention can be applied to a case that lottery processing is executed with respect to commands for instructing a character operated by a user in a battle game or an RPG game. In this case, instead of the images 107, a plurality of commands are set on the roulette reel 108. When a predetermined game condition has been satisfied, the value change processing is executed, and a command is changed with a predetermined change probability. For example, a command "an attack" is replaced with a command "a lethal attack", and thereby, an offensive power against an enemy is enhanced in a battle game.

The image 107 is used as a lottery object in the above embodiment. However, a plurality of lottery candidates are not limited to rewards of credits. Items a user can use in the normal game may be used as the lottery candidates. If each value on the game is quantified for each item, it is possible to obtain the expectant value by using the values quantified and the lottery probabilities thereof. For example, it is possible to determine the expectant value by the following way: a relative numerical-value is given in advance to each item according to rarity, importance, an effect obtained in a game, and the like; and an expected value of a lottery is calculated by using the numeral-values given. In this case, as an item is replaced with another item having hither rarity, the expectant value as the lottery result is enhanced. In this way, in a case that the expectant value as the lottery result is impossible to be represented as a numeral-value like a dividend of credits, the expectant value may be determined by calculating the expected value of the lottery processing using the numeral-value, which is given to each item in advance according to its rarity, importance and the like. Also, with respect to the mentioned commands, the expectant value may be determined by calculating an expected value based on numeral-values, each of which is given to each command according to its characteristics (for example, an offensive power, a defense power and the like).

As mentioned above, it is possible to deal with the items and the commands as objective value by quantification. On the other hand, instead of the objective value on a game, the expectant value may be set in the light of subjective value of a user. The subjective value is sometimes different between users. For example, an item desired depending on a progressing state of a game is different between users, and a selection is different between users depending on a user's like. Even in this case, by changing items and the like, the value of them can be changed. As a result of that, it can be understood that the expectant value as the lottery result has been changed. In this way, the expectant value as the lottery result is a concept including a value determined by subjective value of users. Even in a case that the expectant value is taken as subjective value, a user is allowed to specify an item he/she desires, or an item a user often used is extracted in reference to the game-play data 43 of the user and the item extracted is specified. And then, the item specified is set as the item changed. Thereby, it is possible to realize a control for changing the expectant value.

In the above mentioned embodiment, it is described as an example that plural lottery candidates are changed. However, the lottery probabilities for selections from the plural lottery candidates may be changed. In this case, the lottery probabilities set on the lottery table data 44 may be changed. For example, the bullet 102b is controlled to hit only the jack pot image 107 of the roulette reel 108. Each time when the bullet 102b hits the jack pot image 107, the value change lottery is executed. When the value change is selected, the lottery table data 44 may be set so that the lottery probability of the jack pot image 107 increases and the lottery probabilities of the other images 107 decrease. When the lottery probability of the jack pot image 107 increases, the expected value of a reward a user can obtain increases. Accordingly, the expectant values as the lottery result before and after the change of the lottery probability is different from each other.

In the above mentioned embodiment, the value change lottery is executed at step S15 in FIG. 18. However, it is not necessary to execute the value change lottery. In this case, the processing of steps S15 and S16 of FIG. 18 is omitted. And, when the bullet 102b hits the image 107, the hit image 107 is changed. Alternatively, instead of the value change lottery of step S15, the expectant value as the lottery result may be changed according to the number of times that a predetermined game condition is satisfied. This case may be realized in such a way that, for example, when the bullet 102b hits the image 107 10 times, the image 107 is changed. Alternatively, instead of the value change lottery of step S15, the expectant value may be changed according to a consumption state of the game value. This case may be realized in such a way that, for example, the number of medals M, or credits, to be consumed is set, and each time when the number of medals M or credits are consumed, the expectant value is changed. At step S18 of FIG. 18, the images 107 changed are settled after the shooting game ends. However, it does not matter when the images 107 should be settled in the ongoing shooting game. Further, in the above mentioned embodiment, it is described as an example that the expectant value is changed by its increase. However, the present invention is not limited to this embodiment. The expectant value may be changed by decrease of the value. It may be determined as appropriate according to the kind or progress of the game whether the expectant value is increased or decreased.

The above mentioned embodiment is described using the medals M as the game value. However, the preset invention is not limited to this embodiment. For example, the game value may be game currency to be obtained in exchange for corresponding value, or payment of a game-play fee for playing a game. Further, when the present invention is applied to the battle game as mentioned above, the RPG game, or the like, the range where the present invention is available includes not only the game machine 2 which allows a user to play a game in exchange for consumption of medals M, but also a personal computer which allows a user to play an online game and a portable terminal such as a smart phone where a game application has been installed.

Various kinds of Embodiments can be led from the above mentioned embodiment and variations as follows. In the following descriptions, corresponding members shown in the drawings are indicated in parentheses for making each embodiment of the present invention comprehensible. However, the present invention is not limited to the embodiment shown in the drawings.

A game system as one aspect of the present invention is a game system (as one example, the game system 1 shown in FIG. 1) including a computer, the computer by executing a computer program functioning as: a lottery execution device (as one example, the lottery execution portion 32 shown in FIG. 14) which is configured to execute lottery processing where at least one lottery candidate is selected from a plurality of lottery candidates (as one example, the rewards shown in FIG. 16), and give value according to a lottery result to a user; a performance control device (as one example, the lottery-performance control portion 33 shown in FIG. 14) which is configured to control a display device (as one example, the monitor 15 shown in FIG. 1) to display a lottery-performance image (as one example, the game screens 110a to 110g shown in FIGS. 9 to 13, FIG. 19, and FIG. 20) which is an image for performing a lottery; a game control device (as one example, the lottery-performance control portion 33 shown in FIG. 14) which is configured to control a game which is played by a user while the lottery-performance image is displayed on the display device; and a value change device (as one example, the value change portion 34 shown in FIG. 14) which is configured to change an expectant value as the lottery result depending on a game-play state of the game, and settle the expectant value changed at predetermined timing of the game, wherein the lottery execution device is configured to execute the lottery processing based on the expectant value settled by the value change device.

A control method as one aspect of the present invention is a control method of a computer incorporated into a game system, the control method comprising the steps: a lottery execution step (As one example, steps S19 and S20 shown in FIG. 18) of executing lottery processing where at least one lottery candidate is selected from a plurality of lottery candidates, and giving value according to a lottery result to a user; a performance control step (as one example, steps S11 to S21 shown in FIG. 18) of controlling a display device to display a lottery-performance image which is an image for performing a lottery; a game control step (as one example, steps S13 to S17 shown in FIG. 18) of controlling a game which is played by a user while the lottery-performance image is displayed on the display device; and a value change step (as one example, steps S14 to S16 shown in FIG. 18) of changing an expectant value as the lottery result depending on a game-play state of the game, and settling the expectant value changed at predetermined timing of the game, wherein the lottery execution step of executing the lottery processing based on the expectant value settled by the value change device.

A non-transitory computer readable storage medium as one aspect of the present invention is a non-transitory computer readable storage medium (as one example, the game computer program 42 shown in FIG. 14) having stored therein a computer program to be executed by a computer of a game system, the computer program comprising instructions that cause the computer to functions as: a lottery execution device which is configured to execute lottery processing where at least one lottery candidate is selected from a plurality of lottery candidates, and give value according to a lottery result to a user; a performance control device which is configured to control a display device to display a lottery-performance image which is an image for performing a lottery; a game control device which is configured to control a game which is played by a user while the lottery-performance image is displayed on the display device; and a value change device which is configured to change an expectant value as the lottery result depending on a game-play state of the game, and settle the expectant value changed at predetermined timing of the game, wherein the lottery execution device is configured to execute the lottery processing based on the expectant value settled by the value change device.

By making the computer execute the game computer program, it is possible to realize a game system of the present invention with the computer. The non-transitory computer readable storage medium of the present invention may be a CDROM or the like.

As one embodiment of the game system of the present invention, the performance control device may be configured to change the lottery-performance image according to the expectant value changed by the value change device, and control the display device to display the lottery-performance image changed.

As one embodiment of the game system of the present invention, the performance control device may be configured to control the display device to display, as the lottery-performance image, a plurality of lottery objects (as one example, the images 107 shown in FIG. 9) each being linked with each of the plurality of lottery candidates. In this embodiment, the game control device may be configured to control the game using the plurality of lottery objects. Further, in this embodiment, the game control device may be configured to control a shooting game where the plurality of lottery objects are set as shooting targets. Also, in this embodiment, the performance control device may be configured to control the display device to display the plurality of lottery objects so that the plurality of lottery objects are revolved in a predetermined sorting order.

Also, in this embodiment, the value change device may be configured to change to change the expectant value by changing the lottery candidate linked with the lottery object which comes into an operation object by a game-play operation to the lottery object by the user. Also, in this embodiment, the game control device may be configured to control the game so as to be played by a plurality of users at a same time, and the value change device may be configured to change the expectant value by changing the lottery candidate linked with the lottery object which comes into an operation object of a game-play operation to the lottery object by each of the plurality of users. Also, in this embodiment, the value change device may be configured to change the expectant value by changing together the lottery candidates liked with the plurality of the lottery objects or probabilities that the lottery candidates are selected, according to a game-play operation to the lottery objects by the user.

As one embodiment of the game system of the present invention, the value change device may further include a selection change device (as one example, the value change portion 34 shown in FIG. 14) which is configured to select whether the expectant value is changed under condition that a predetermined game condition has been satisfied in the game. Further, in this embodiment, the game condition may be that a game-play operation to the lottery object is inputted by a user. Also, in this embodiment, the game control device may be configured to control the game so that game value (as one example, the medals M shown in FIG. 7) is consumed according to the game-play operation to the lottery object by the user, and the value change device may be configured to change the expectant value according to a consumption state of game value in the game. Also, in this embodiment, the value change device may be configured to change the expectant value according to how many times the game condition is satisfied.

As one aspect of the game system of the present invention, the lottery execution device may be configured to execute a lottery using a lottery table (as one example, the lottery table data 44 and the image data 45 shown in FIGS. 15 and 16) where a plurality of lottery probabilities are correlated to the plurality of lottery candidates respectively, and the value change device may be configured to change the expectant value by changing at least one part of the plurality of lottery candidates and/or lottery probabilities of the plurality of lottery candidates as the expectant value.

DESCRIPTION OF REFERENCE SYMBOLS

1 Game System
2 Game Machine
3 Station Unit
15 Monitor (Display Device)
31 Game Control Portion
32 Lottery Execution Portion (Lottery Execution Device)
33 Lottery-Performance Control Portion (Performance Control Device, Game Control Device)
34 Value Change Portion (Value Change Device, Selection Change Device)
110*a* to 110*g* Game Screens (Lottery-Performance Images)

What is claimed is:

1. A game system including a processor, the processor functions:
   to execute a lottery game where at least one lottery candidate is selected from a plurality of lottery candidates, and give value according to a lottery result to a user;
   to control a display device to display a lottery-performance image which is an image for performing the lottery game;
   to control an other game which is a different type than the lottery game and played by a user while the lottery-performance image is displayed on the display device; and
   to change an expectant value as the lottery result depending on a game-play state of the other game, and settle the expectant value changed at predetermined timing of the other game, wherein
   the processor is configured to execute the lottery game based on the settled expectant value so that a play state of the other game played in a process, in which the lottery game is being performed by displaying the lottery-performance image, affects the lottery result corresponding to the performing of the lottery game.

2. The game system according to claim 1, wherein the processor is configured to change the lottery-performance image according to the changed expectant value, and control the display device to display the lottery-performance image changed.

3. The game system according to claim 1, wherein the processor is configured to control the display device to display, as the lottery-performance image, a plurality of lottery objects each being linked with each of the plurality of lottery candidates.

4. The game system according to claim 3, wherein the processor is configured to control the other game using the plurality of lottery objects.

5. The game system according to claim 4, wherein the processor is configured to control a shooting game as the other game where the plurality of lottery objects are set as shooting targets.

6. The game system according to claim 3, wherein the processor is configured to control the display device to display the plurality of lottery objects so that the plurality of lottery objects are revolved in a predetermined sorting order.

7. The game system according to claim 3, wherein the processor is configured to change the expectant value by changing the lottery candidate linked with the lottery object which comes into an operation object by a game-play operation to the lottery object by the user.

8. The game system according to claim 3, wherein the processor is configured to control the other game so as to be played by a plurality of users at a same time, and the processor is configured to change the expectant value by changing the lottery candidate linked with the lottery object which comes into an operation object of a game-play operation to the lottery object by each of the plurality of users.

9. The game system according to claim 3, wherein the processor is configured to change the expectant value by changing together the lottery candidates liked with the plurality of the lottery objects or probabilities that the lottery candidates are selected, according to a game-play operation to the lottery objects by the user.

10. The game system according to claim 1, wherein the processor is configured to select whether the expectant value is changed under condition that a predetermined game condition has been satisfied in the other game.

11. The game system according to claim 10, wherein the game condition is that a game-play operation to the lottery object is inputted by a user.

12. The game system according to claim 11, wherein the processor is configured to control the other game so that game value is consumed according to the game-play operation to the lottery object by the user, and the processor is configured to change the expectant value according to a consumption state of game value in the other game.

13. The game system according to claim 10, wherein the processor is configured to change the expectant value according to how many times the game condition is satisfied.

14. The game system according to claim 1, wherein the processor is configured to execute the lottery game using a lottery table where a plurality of lottery probabilities are correlated to the plurality of lottery candidates respectively, and the processor is configured to change the expectant value by changing at least one part of the plurality of lottery candidates and/or lottery probabilities of the plurality of lottery candidates as the expectant value.

15. A control method of a computer incorporated into a game system, the control method comprising:
executing a lottery game where at least one lottery candidate is selected from a plurality of lottery candidates, and giving value according to a lottery result to a user;
controlling a display device to display a lottery-performance image which is an image for performing the lottery game;
controlling an other game which is a different type than the lottery game and played by a user while the lottery-performance image is displayed on the display device; and
changing an expectant value as the lottery result depending on a game-play state of the other game, and settling the expectant value changed at predetermined timing of the other game, wherein
the lottery game is executed based on the settled expectant value so that a play state of the other game played in a process, in which the lottery game is being performed by displaying the lottery-performance image, affects the lottery result corresponding to the performing of the lottery game.

16. A non-transitory computer-readable storage medium having stored therein a computer program to be executed by a computer of a game system, the computer program comprising instructions that cause the computer:
to execute a lottery game where at least one lottery candidate is selected from a plurality of lottery candidates, and give value according to a lottery result to a user;
to control a display device to display a lottery-performance image which is an image for performing the lottery game;
to control an other game which is a different type than the lottery game and played by a user while the lottery-performance image is displayed on the display device; and
to change an expectant value as the lottery result depending on a game-play state of the game, and settle the expectant value changed at predetermined timing of the other game, wherein
the lottery game is executed based on the settled expectant value so that a play state of the other game played in a process, in which the lottery game is being performed by displaying the lottery-performance image, affects the lottery result corresponding to the performing of the lottery game.

* * * * *